United States Patent [19]

Nakajima et al.

[11] 3,958,167

[45] May 18, 1976

[54] PULSE MOTOR

[75] Inventors: Fumio Nakajima, Tokyo; Akira Nikaido, Fuchu; Mitsuo Onda, Oomiya; Takayasu Machida, Iruma; Takashi Toida, Tokyo, all of Japan

[73] Assignee: Citizen Watch Co., Ltd., Tokyo, Japan

[22] Filed: Nov. 30, 1973

[21] Appl. No.: 420,698

[30] Foreign Application Priority Data
Dec. 4, 1972   Japan.............................. 47-121402
Nov. 15, 1973  Japan.............................. 48-128551

[52] U.S. Cl. ............................................. 318/696
[51] Int. Cl.² ......................................... H02P 7/00
[58] Field of Search ........... 318/329, 341, 597, 601, 318/603, 685, 696

[56] References Cited
UNITED STATES PATENTS

| | | | |
|---|---|---|---|
| 3,112,433 | 11/1963 | Fairbanks ...................... | 318/696 X |
| 3,441,821 | 4/1969 | Tomota et al. .................. | 318/341 X |
| 3,458,786 | 7/1969 | Thompson ...................... | 318/597 X |
| 3,541,417 | 11/1970 | Frank, Jr. ...................... | 318/603 X |

*Primary Examiner*—Robert K. Schaefer
*Assistant Examiner*—W. E. Duncanson, Jr.
*Attorney, Agent, or Firm*—Ernest G. Montague; Karl F. Ross; Herbert Dubno

[57] ABSTRACT

A reversible pulse-motor driving circuit comprising a steady driving circuit composed of an oscillator circuit, a frequency divider circuit, a waveform conversion circuit, and a driving circuit, and a fast correction driving-circuit composed of a fast correction set-circuit, a first gate circuit, a detector circuit, a normal and reverse discrimination circuit, a conversion change-over circuit, a pulse selector circuit, a first memory circuit, a second gate circuit and a second memory circuit, whereby a user can hear a time signal delivered from a calculation circuit and only push a pushbutton to rotate the pulse motor in a reverse direction when the second hand is ahead of the correct time, and rotate the pulse motor in a forward direction when the second hand is lagging with respect to the correct time, and the use of a frequency higher than the steady driving frequency permits a fast setting of the second, minute or hour hand to the correct time. A reversible pulse motor for use in timepiece and more particularly in wrist watch is disclosed which can be rotated in forward and reverse directions by the driving circuit, which is small in size and which can operate with a minimal consumption of the electtric power.

5 Claims, 20 Drawing Figures

| | | | | | | | | | | | | | |
|---|---|---|---|---|---|---|---|---|---|---|---|---|---|
| 0 | 0 | 0 | 0 | 0 | 0 | 0 | 32 | 1 | 0 | 0 | 0 | 0 | 0 |
| 1 | 0 | 0 | 0 | 0 | 0 | 1 | 33 | 1 | 0 | 0 | 0 | 0 | 1 |
| 2 | 0 | 0 | 0 | 0 | 1 | 0 | 34 | 1 | 0 | 0 | 0 | 1 | 0 |
| 3 | 0 | 0 | 0 | 0 | 1 | 1 | 35 | 1 | 0 | 0 | 0 | 1 | 1 |
| 4 | 0 | 0 | 0 | 1 | 0 | 0 | 36 | 1 | 0 | 0 | 1 | 0 | 0 |
| 5 | 0 | 0 | 0 | 1 | 0 | 1 | 37 | 1 | 0 | 0 | 1 | 0 | 1 |
| 6 | 0 | 0 | 0 | 1 | 1 | 0 | 38 | 1 | 0 | 0 | 1 | 1 | 0 |
| 7 | 0 | 0 | 0 | 1 | 1 | 1 | 39 | 1 | 0 | 0 | 1 | 1 | 1 |
| 8 | 0 | 0 | 1 | 0 | 0 | 0 | 40 | 1 | 0 | 1 | 0 | 0 | 0 |
| 9 | 0 | 0 | 1 | 0 | 0 | 1 | 41 | 1 | 0 | 1 | 0 | 0 | 1 |
| 10 | 0 | 0 | 1 | 0 | 1 | 0 | 42 | 1 | 0 | 1 | 0 | 1 | 0 |
| 11 | 0 | 0 | 1 | 0 | 1 | 1 | 43 | 1 | 0 | 1 | 0 | 1 | 1 |
| 12 | 0 | 0 | 1 | 1 | 0 | 0 | 44 | 1 | 0 | 1 | 1 | 0 | 0 |
| 13 | 0 | 0 | 1 | 1 | 0 | 1 | 45 | 1 | 0 | 1 | 1 | 0 | 1 |
| 14 | 0 | 0 | 1 | 1 | 1 | 0 | 46 | 1 | 0 | 1 | 1 | 1 | 0 |
| 15 | 0 | 0 | 1 | 1 | 1 | 1 | 47 | 1 | 0 | 1 | 1 | 1 | 1 |
| 16 | 0 | 1 | 0 | 0 | 0 | 0 | 48 | 1 | 1 | 0 | 0 | 0 | 0 |
| 17 | 0 | 1 | 0 | 0 | 0 | 1 | 49 | 1 | 1 | 0 | 0 | 0 | 1 |
| 18 | 0 | 1 | 0 | 0 | 1 | 0 | 50 | 1 | 1 | 0 | 0 | 1 | 0 |
| 19 | 0 | 1 | 0 | 0 | 1 | 1 | 51 | 1 | 1 | 0 | 0 | 1 | 1 |
| 20 | 0 | 1 | 0 | 1 | 0 | 0 | 52 | 1 | 1 | 0 | 1 | 0 | 0 |
| 21 | 0 | 1 | 0 | 1 | 0 | 1 | 53 | 1 | 1 | 0 | 1 | 0 | 1 |
| 22 | 0 | 1 | 0 | 1 | 1 | 0 | 54 | 1 | 1 | 0 | 1 | 1 | 0 |
| 23 | 0 | 1 | 0 | 1 | 1 | 1 | 55 | 1 | 1 | 0 | 1 | 1 | 1 |
| 24 | 0 | 1 | 1 | 0 | 0 | 0 | 56 | 1 | 1 | 1 | 0 | 0 | 0 |
| 25 | 0 | 1 | 1 | 0 | 0 | 1 | 57 | 1 | 1 | 1 | 0 | 0 | 1 |
| 26 | 0 | 1 | 1 | 0 | 1 | 0 | 58 | 1 | 1 | 1 | 0 | 1 | 0 |
| 27 | 0 | 1 | 1 | 0 | 1 | 1 | 59 | 1 | 1 | 1 | 0 | 1 | 1 |
| 28 | 0 | 1 | 1 | 1 | 0 | 0 | 60 | 1 | 1 | 1 | 1 | 0 | 0 |
| 29 | 0 | 1 | 1 | 1 | 0 | 1 | | (0 | 0 | 0 | 0 | 0 | 0) |
| 30 | 0 | 1 | 1 | 1 | 1 | 0 | | | | | | | |
| 31 | 0 | 1 | 1 | 1 | 1 | 1 | | | | | | | |

FIG. 9

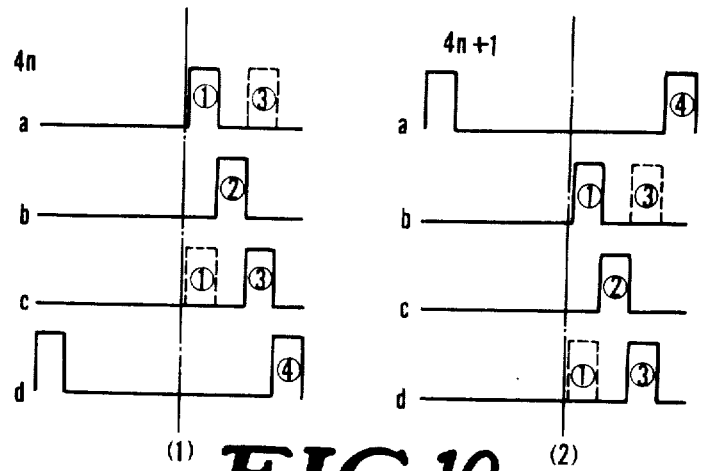
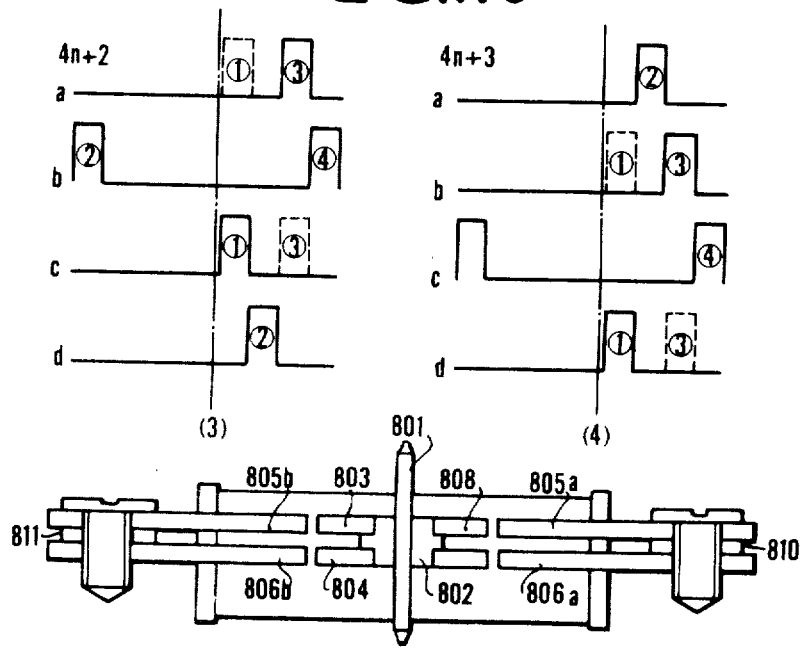
FIG.10
FIG.12
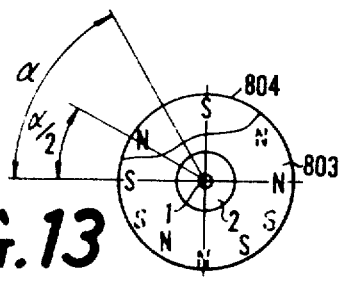
FIG.13

PULSE MOTOR

THE DETAILED DESCRIPTION OF THE INVENTION

1. Field of the Invention

This invention relates to a reversible pulse motor driving circuit for use in timepieces such as a wrist watch and the like.

2. Background of the Invention

Most of all small type pulse motors for use in crystal timepieces and more particularly in crystal wrist watches are rotatable in a given direction only.

Such a function of the pulse motor is sufficient under steady state condition but is inconvenient for setting the timepiece to the correct time. That is, in order to set the timepiece to the correct time, it is necessary to push a stem interlocked with a switch to reset circuits incorporated in the timepiece and hold the second hand at the correct time until the minute hand is reset. Furthermore, when the second hand has to be mechanically reset to zero, even when the time signal occurs at the expected time, the operation of pulling back the stem is time consuming, thus rendering time setting difficult. When a pulse motor rotatable in a given direction is controlled by a calculating circuit, it is possible to stop the second hand which has been advanced to the correct for a number of seconds time or to speed up the second hand which has lagged from the correct time for a number of seconds lagged from the correct time, thereby setting the second hand to the correct time. But, when the second hand has been advanced to the correct time, the user is uncertain whether or not the timepiece mechanism operates correctly.

OBJECTS OF THE INVENTION

It is an object of the invention to provide a reversible pulse motor driving circuit which can obviate the abovementioned disadvantage and by means of which a user can hear a time signal delivered from a calculation circuit and only push a pushbutton to rotate the pulse motor in a reverse direction when the second hand is ahead of the correct time, rotate the pulse motor in a forward direction when the second hand is lagging with respect to the correct time, and the use of a frequency higher than the normal driving frequency permitting the fast correction of the second, minute or hour hand by the correct time to be effected.

Another object of the invention is to provide a reversible pulse motor driving circuit which is provided with a memory circuit composed of a counter which is capable of memorizing the second-hand position in correspondence with the pulse motor and which can effect the fast correction of time.

A further object of the invention is to provide a reversible pulse-motor driving circuit which is provided with a memory circuit which operates as an addition counter when the pulse motor is rotated in a normal direction and operates as a subtraction counter when the pulse motor is rotated in the opposite direction and which can effect the fast correction of time.

A still further object of the invention is to provide a reversible pulse motor driving circuit which is provided with a memory circuit which operates as a subtraction counter when the pulse motor is rotated in a normal direction and operates as an addition counter when the pulse motor is rotated in the opposite direction and which can effect the fast correction of time.

Another object of the invention is to provide a reversible pulse motor which can be driven by the abovementioned driving circuit.

A further object of the invention is to provide a reversible pulse motor which is relatively thin, which can be driven by the above mentioned driving circuit and which is particularly suitable for use in a wristwatch.

The invention will now be described in greater detail in connection with the annexed drawing, in which:

FIG. 2 is a circuit diagram of the electrical components of the oscillator circuit and frequency-divider circuit shown in FIG. 1;

FIG. 9 is a truth table showing values of the first memory circuit for the binary counter of arbitrary number 60;

FIG. 10 is a wave form diagram illustrating the order of the fast correction pulses to be applied to the driving coil terminals;

FIG. 12 is a section along line x—x in FIG. 11A;

FIG. 13 is a plan view of the permanent magnet rotor of the reversible pulse motor shown in FIG. 11A;

Figure 1:
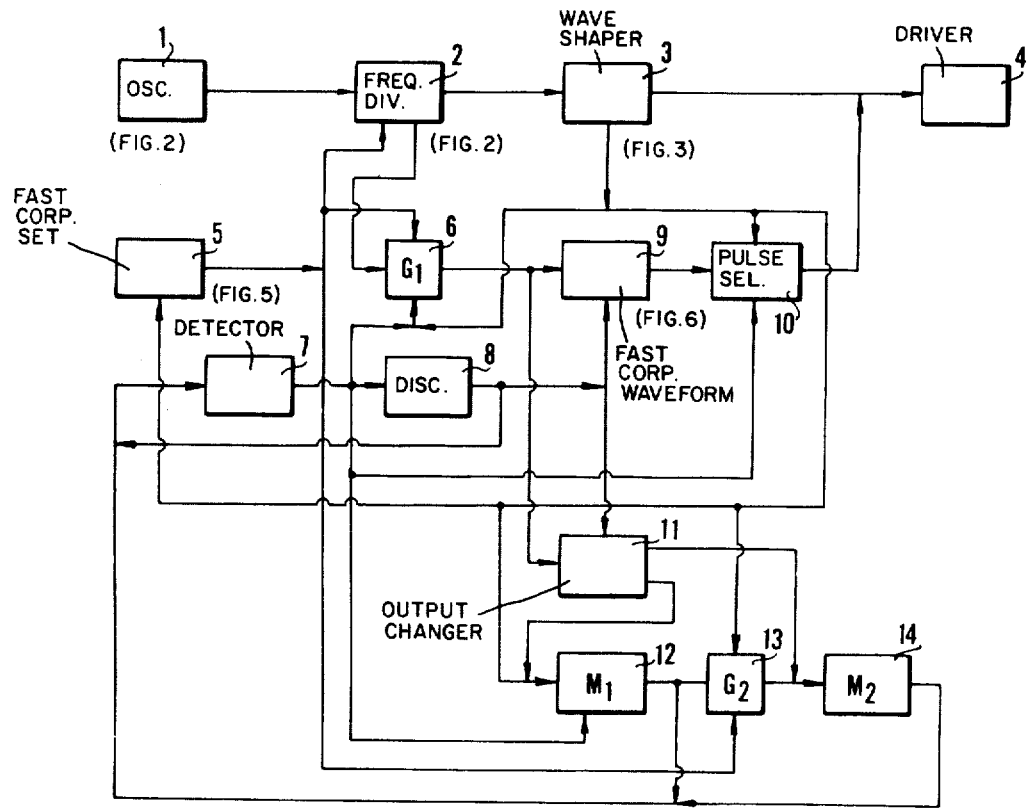
FIG. 1 is a block diagram showing one embodiment of the pulse-motor driving circuit according to the invention.

FIG. 1 shows a block diagram showing essential electrical components of the reversible pulse-motor driving circuit according to the invention. In FIG. 1, reference numeral 1 designates an oscillator circuit, 2 a frequency divider circuit, 3 a waveform conversion circuit, 4 a driving circuit, 5 a fast-correction set circuit, 6 a first gate circuit, 7 a detector circuit, 8 a normal and reverse discrimination circuit, 9 a fast correction wave form conversion and change-over circuit, 10 a pulse selector circuit, 11 an output change-over circuit; 12 a first memory circuit, 13 a second gate circuit, and 14 a second memory circuit.

FIG. 2 shows one embodiment of the crystal oscillator circuit 1 and the frequency divider circuit 2 shown in FIG. 1. The crystal oscillator circuit 1 shown by a dot and dash lines is composed of an oscillator 103, inverters 102, 106, a resistor 101, and condensers 104, 105. The frequency divider circuit 2 shown by a dot and dash lines is composed of an inverter 107 and flip-flops 108 to 116. The output terminal of the oscillator circuit 1 is connected to one of two input terminals of the first stage flip-flop 108 and connected through the inverter 107 to the other input terminal of the first stage flip-flop 108 whose output terminals 117, 118 are connected through certain number of flip-flops (not shown) to the two input terminals 119, 120 of the flip-flop $FF_1$ 109.

Figure 3:
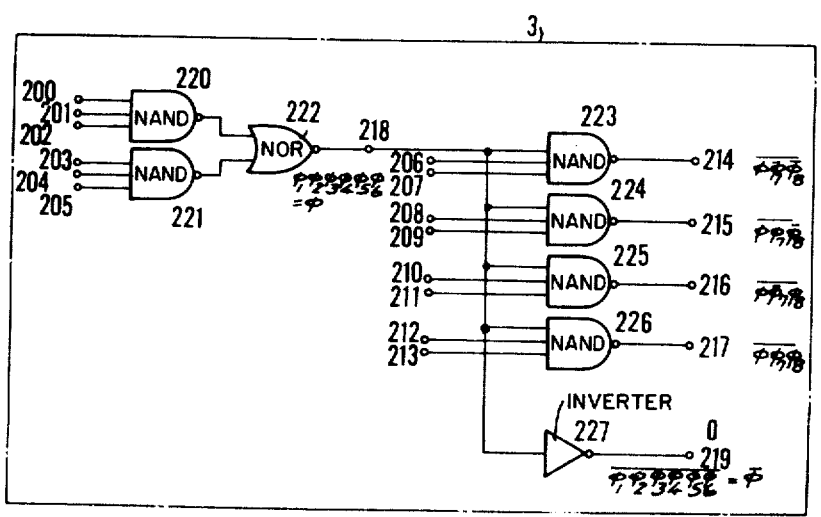
FIG. 3 is a circuit diagram of the electrical components of the waveform conversion circuit shown in FIG. 1.
Figure 6:
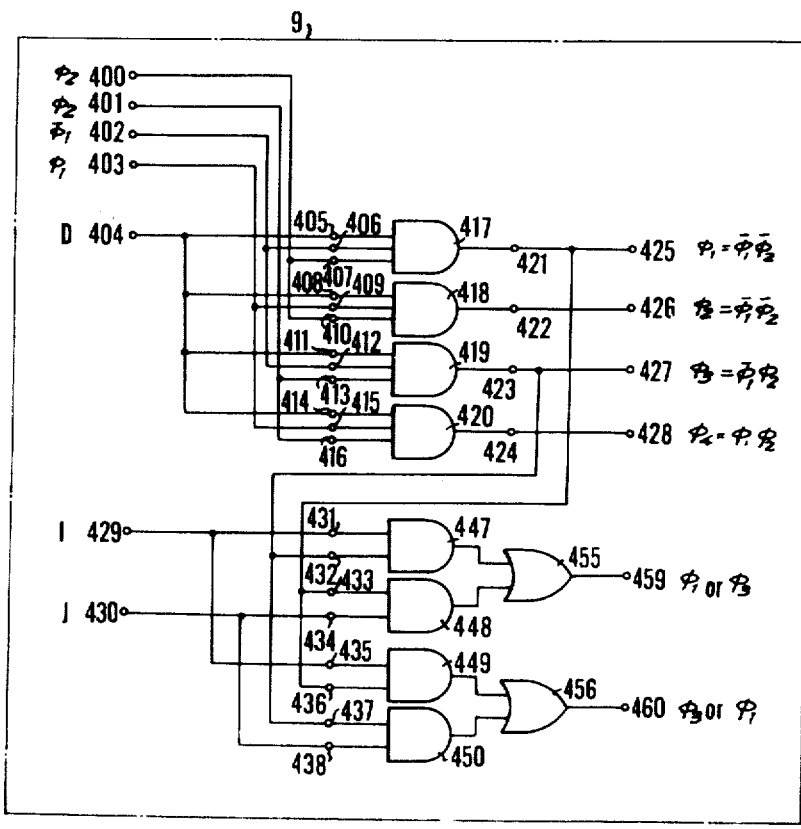
FIG. 6 is a circuit diagram of the electrical components of the fast-correction wave form conversion and change-over circuit shown in FIG. 1.

The output $\phi_1$ from the flip-flop $FF_1$ 109 is delivered through lines 121, 133 to the terminal 200 of the wave form conversion circuit 3 shown in FIG. 3 and delivered to the terminal 403 of the fast correction wave form conversion and switch-over circuit 9 shown in FIG. 6.

The other output $\bar{\phi}_1$ from the flip-flop FF 109 is delivered through lines 122, 134 to the terminal 402 of the fast correction wave form conversion and change-over circuit 9. The output $\phi_2$ from the flip-flop $FF_2$ 110 is delivered through lines 123, 135 to the terminal 201 of the wave form conversion circuit 3 shown in FIG. 3 and to the terminal 401 of the fast correction wave form conversion and change-over circuit 9. The other output $\bar{\phi}_2$ from the flip-flop $FF_2$ 110 is delivered to the terminal 400 of the fast correction waveform converting and change-over circuit 9.

The output $\phi_3$ from the flip-flop $FF_3$ 111 is delivered through lines 125, 137 to the terminal 202 of the waveform conversion circuit 3 shown in FIG. 3. The output $\phi_4$ from the flip-flop $FF_4$ 112 is delivered through lines 126, 138 to the terminal 203 of the waveform conversion circuit 3 shown in FIG. 3. The output $\phi_5$ from the flip-flop $FF_5$ 113 is delivered through lines 127, 139 to the terminal 204 of the wave form conversion circuit 3 shown in FIG. 3. The output $\phi_6$ from the flip-flop $FF_6$ 114 is delivered through lines 128, 140 to the terminal 205 of the waveform conversion circuit 3 shown in FIG. 3. The output $\phi_7$ from the flip-flop $FF_7$ 115 is delivered through lines 129, 141 to the terminals 208, 212 of the waveform conversion circuit 3 shown in FIG. 3. The other output $\bar{\phi}_7$ from the flip-flop $FF_7$ 115 is delivered through lines 130, 142 to the terminals 206, 210 of the waveform conversion circuit 3 shown in FIG. 3. The output $\phi_8$ from the flip-flop $FF_8$ 118 is delivered through lines 131, 143 to the terminals 211, 213 of the waveform conversion circuit 3 shown in FIG. 3. The other $\bar{\phi}_8$ from the flip-flop $FF_8$ 118 is delivered through lines 132, 144 to the terminals 207, 209 of the waveform conversion circuit 3 shown in FIG. 3.

If the input frequency to the flip-flop $FF_1$ 109 is 64 Hz, the output $\phi_6$ from the flip-flop $FF_6$ 114 becomes 1 Hz, the output $\phi_7$ from the flip-flop $FF_7$ 115 becomes ½ Hz, and the output $\phi_8$ from the flip-flop $FF_8$ 116 becomes ¼ Hz. In addition, the flip-flops $FF_1$ 109 to $FF_8$ 116 are provided with reset terminals 145 to 152, respectively. These reset terminals 145 to 152 are connected through a terminal 153 to the output terminal 316 of an inverter 315 of the fast correction set circuit 5 shown by dots and dash lines in FIG. 5 and are reset to 0 means of the output from the fast correction set circuit 5. The negative going output causes the flip-flop $FF_7$ 115 to turn from 0 to 1 after 1 second. The flip-flop $FF_6$ 114 is turned from 0 to 1 after 0.5 second.

As seen from FIG. 3, the waveform conversion circuit 3 consists of a first conversion part composed of two NAND gates 220, 221 and a NOR gate 222 and of a second conversion part composed of four NAND gates 223, 224, 225, 226 and an inverter 227. To the input terminals of the NAND gates 220, 221 of the first conversion fast are applied outputs from respective frequency divider stages of the frequency divider circuit. That is, $\phi_1$ is applied to the input terminal 200, $\phi_2$ is applied to the input terminal 201, $\phi_3$ is applied to the input terminal 202, $\phi_4$ is applied to the input terminal 203, $\phi_5$ is applied to the input terminal 204 and $\phi_6$ is applied to the input terminal 205. From the output terminal 218 of the first conversion part is delivered an output $\phi_1 \cdot \phi_2 \cdot \phi_3 \cdot \phi_4 \cdot \phi_5 \cdot \phi_6 = \phi$. If $\phi_1 = 64$ Hz from the output terminal 218 is delivered a rectangular pulse of 1 Hz whose pulse width in one period is $1/64^{sec}$. This rectangular pulse is applied as a part of the input to the NAND gate of the second conversion part. As described above, $\bar{\phi}_7$ is applied to the input terminal 206 of the NAND gate 223 and $\bar{\phi}_8$ is applied to the input terminal 207 of the NAND gate 223, and as a result, the output from the NAND gate 223 becomes $\phi \cdot \bar{\phi}_7 \cdot \bar{\phi}_8$. $\phi_7$ is applied to the input terminal 208 of the NAND gate 224 and $\phi_8$ is applied to the input terminal 209 of the NAND gate 224 so that the output from the NAND gate 224 becomes $\phi \cdot \bar{\phi}_7 \cdot \bar{\phi}_8 \cdot \bar{\phi}_7$ is applied to the input terminal 210 of the NAND gate 225 and $\bar{\phi}_8$ is applied to the input terminal 211 so that the output from the NAND gate 225 becomes $\phi \cdot \bar{\phi}_7 \cdot \bar{\phi}_8 \cdot \bar{\phi}_7$ is applied to the input terminal 212 of the NAND gate 226 and $\phi_8$ is applied to the input terminal 213 of the NAND gate 226 so that the output from the NAND gate 226 becomes $\phi \cdot \bar{\phi}_7 \cdot \phi_8$. Here, again, $\phi = \phi_1 \cdot \phi_2 \cdot \phi_3 \cdot \phi_4 \cdot \phi_5 \cdot \phi_6$.

The output from the inverter 227 becomes $\bar{\phi}$. The output terminal 219 of the inverter 227 is connected to the input terminals 328, 330 of a NAND gate 327 which is connected through an inverter 328 to the input terminal 323 of the first gate circuit $G_1$ 6 shown in FIG. 5, connected to the input terminal 600 of a NAND circuit 610 which is connected to the input terminal 619 of the first memory circuit $M_1$ 12 shown in FIG. 8, connected to the pulse selector circuit 10, and connected to the input terminal 509 of a ring counter 50 of arbitrary number four shown in FIG. 7. $\bar{\phi}$ causes the first membory circuit $M_1$ 12 to operate as an addition counter which effects its adding operation every one second, thereby detecting the second hand position. $\bar{\phi}$ causes the second gate circuit 13 in its steady state to closed whereby the value of the first memory circuit $M_1$ 12 is set to the second memory circuit $M_2$ 14. $\bar{\phi}$ causes the pulse selector circuit 10 to operate the ring counter 50 of arbitrary number four, thereby selecting driving pulses to be applied to the driving circuit 4 at the time of effecting the fast correction.

Figure 4:
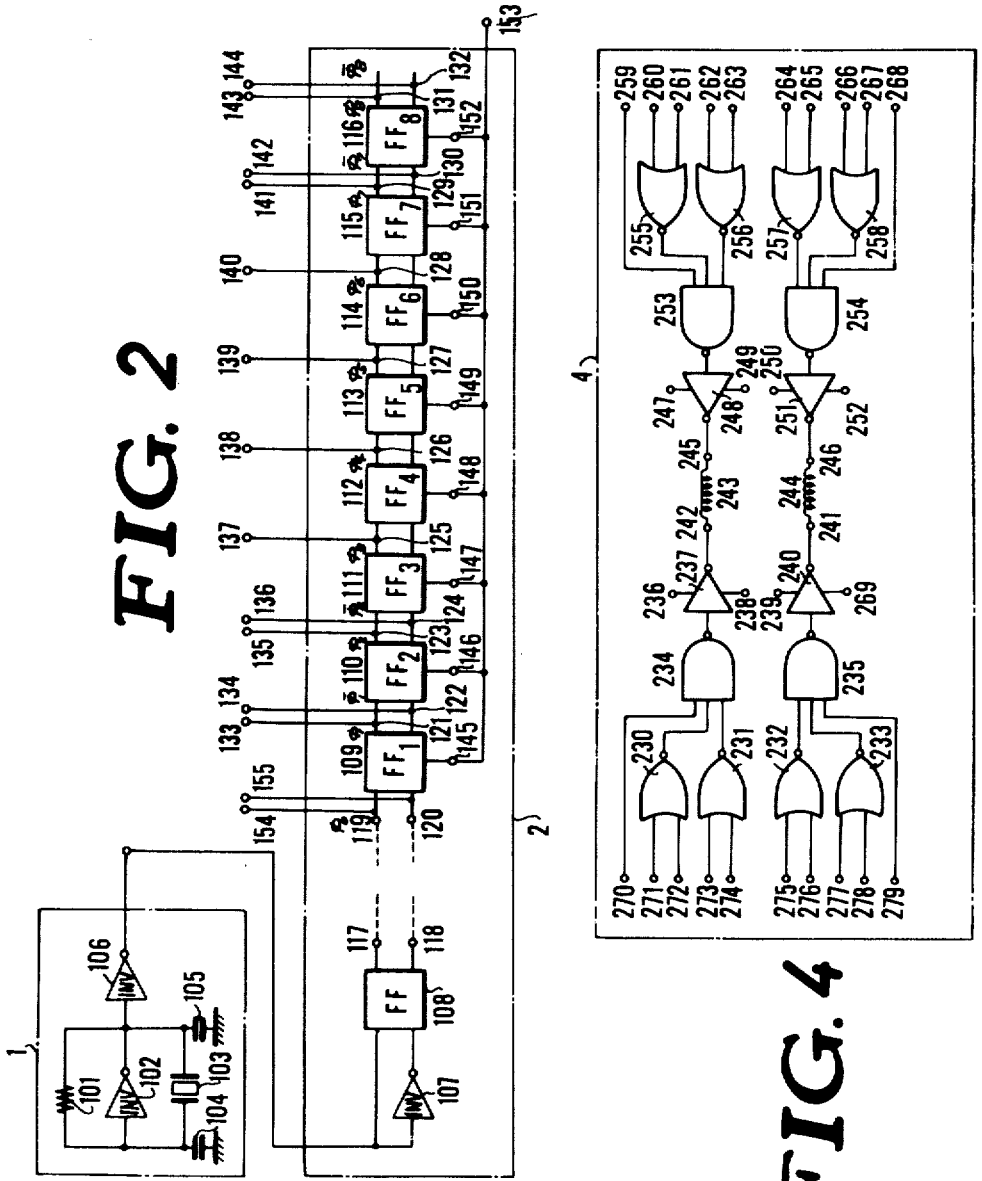
FIG. 4 is a circuit diagram of the electrical components of the driving circuit shown in FIG. 1.

As shown in FIG. 4, the driving circuit 4 shown in FIG. 1 is composed of NOR gates 230 to 233, 255 to 258. NAND gates 234, 235, 253, 254, driving inverters 237, 240, 248, 251, and driving coils 243, 244.

The input terminals 271, 272, 273, 274, 275, 276, 277, 278, 260, 261, 262, 263, 264, 265, 266, 267 of the NOR gates are connected to the NAND output terminals 566, 570, 574, 578, 567, 571, 575, 579, 568, 572, 576, 580, 569, 573, 577, 581 of the pulse selector circuit 10 (FIG. 7), respectively. To each input terminal of the NAND gates 234, 235, 253, 254 is applied a negative pulse so that these NAND gates operate as NOR gates, and as a result, the presence of one input generates an output which is applied to the driving inverter.

The input terminal of the driving inverter 237 shown in FIG. 4 is connected to the output terminal of the NAND gate 234. The electric power supply source terminal 236 is connected to the + side of the electric power supply source, and the grounded terminal 238 is connected to the − side of the electric power supply source. The output terminal of the inverter 237 is connected to the terminal a 242 of the driving coil 243.

The input terminal of the inverter 248 is connected to the output terminal of the NAND gate 253, the electric power supply source 247 is connected to the + side of the electric power supply source, the grounded terminal 249 is connected to the − side of the electric power supply source, and the output terminal is connected to the other terminal 245 of the driving coil 243. Similarly, the input terminal of the inverter 240 is connected to the output terminal of the NAND gate 235. the electric power supply source 239 is connected to the + side of the electric power supply source, the grounded terminal 269 is connected to the − side of the electric power supply source, the output terminal is connected to one terminal b 241 of the driving coil 244, the input terminal of the inverter 251 is connected to the output terminal of the NAND gate 254, the electric power supply source 250 is connected to the + side of the electric power supply source, the grounded terminal 252 is connected to the − side of the electric power supply source, and the output terminal is connected to the other terminal d 246 of the driving coil 244.

Figure 5:
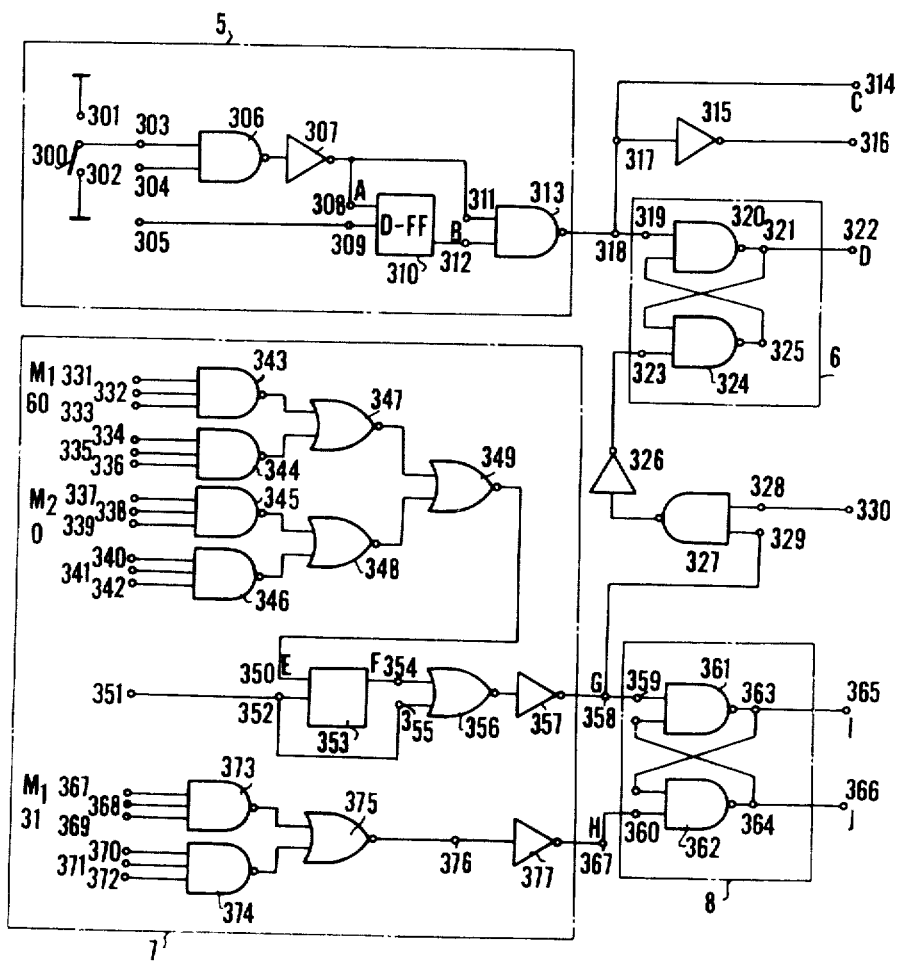
FIG. 5 is a circuit diagram of the electrical components of the fast correction set circuit, first gate circuit, second hand position detector circuit and normal and reverse discriminator circuit shown in FIG. 1.

As shown in FIG. 5, the fast-correction set circuit 5 shown in FIG. 1 is composed of a switch 300, NAND gates 306, 313, an inverter 307, and a date-type flip-flop (D-FF) 310. The input terminal 303 of the NAND gate 306 is connected to the switch 300, and the terminal 304 is connected to the output terminal 219 (output $\bar{\phi}$) of the inverter 227 of the wave form conversion circuit 3 shown in FIG. 3. As a result, when the steady state driving pulse is applied to the driving coil, the fast correction driving pulse is prevented from being produced. To the data terminal A 308 of the flip-flop D-FF 310 is applied through the inverter 307 the output from the NAND gate 306. In the steady state, the switch 300 is connected to the grounded terminal 302 so that the output from the NAND gate becomes 1, that is, the output from the inverter 307 becomes 0. To the DATA terminal A 308 of the D-FF 310 is always applied 0. The clock input terminal 309 of the D-FF 310 is connected through the terminal 305 to one of the input terminals 119, 154 of the flip-flop $FF_1$ 109 of the frequency divider circuit 2 shown in FIG. 2. At the time of the raising the clock pulse $\phi_o$ (0 → 1), the value of the DATA terminal 308 of the D-FF 310 is reversed in polarity and appears at the output terminal B 312. The input terminal 311 of the NAND gate 313 is 0 at the steady state and the NAND gate 313 is not operated so that a set pulse is not produced.

As shown in FIG. 5, the first gate circuit 6 is composed of NAND gates 320, 324 which constitute a Reset-Set Inverse flip-flop (RSI-FF). To the input terminal 319 of the NAND gate 320 is connected the output terminal 318 of the fast correction set circuit 5 and to the input terminal 323 of the other NAND gate 324 is connected through the inverter 326 the output terminal of the NAND gate 327, one of the input terminals 330, 328 of which is conneceted to the output terminal 219 (output $\bar{\phi}$) and the other input terminal 329 is connected to the output terminal G 358 of a second hand position detector circuit 7.

The second hand position detector circuit 7 is constructed as shown in FIG. 5. To the input terminals of the NAND gates 343, 344 are applied the output from each DATA-FF of the first memory circuit $M_1$ 12 shown in FIG. 8. Let the outputs of the FF, $p_6, p_5, p_4, p_3, p_2, p_1$ of the first memory circuit $M_1$ 12 be $P_6, p_5, p_4, p_3, p_2, p_1$, respectively the input terminal 331 of the NAND gate 343 is connected to the output terminal 627 (output $p_6$) of the FF $p_6$ of the first memory circuit $M_1$ 12, the input terminal 332 of the NAND gate 343 is connected to the output terminal 626 (output $p_5$) of the FF $p_5$ of the first memory circuit $M_1$ 12, the input terminal 333 of the NAND gate 343 is connected to the output terminal 625 (output $p_4$) of the FF $p_4$ of the first memory circuit 12, the input terminal 334 of the NAND gate 344 is connected to the output terminal 624 (output $p_3$) of the first memory circuit 12, the input terminal 335 of the NAND gate 344 is connected to the output terminal 623 (output $p_2$) of the first memory circuit 12, and the input terminal 336 of the NAND gate 344 is connected to the output terminal 621 (output $p_1$) of the first memory circuit $M_1$ 12. The outputs from the NAND gates 343, 344 are applied to a NOR gate 347 as its inputs. These two NAND gates 343, 344 and one NOR gate 347 operate as a six input AND gate.

If the outputs from the $P_6, P_5, P_4, P_3, P_2$ and $P_1$ are $p_6, p_5, p_4, p_3, p_2$, and $p_1$, respectively, when the outputs from the first memory circuit $M_1$ 12 is (1 1 1 1 0 0), that is, $p_6 = 1, p_5 = 1, p_4 = 1, p_3 = 1, p_2 = 0$ ($\bar{p}_2 = 1$), and $p_1 = 0$ ($\bar{p}_1 = 1$), from the NOR gate 347 is delivered an output which is applied through a NOR gate 349 to the DATA terminal E 350 of a DATE-EF 353.

To the input terminals of NAND gates 345, 346 are applied the DATA-FF of the second memory circuit $M_2$ 14. Let the outputs from $FF_3$ $Q_6, Q_5, Q_4, Q_3, Q_2, Q_1$ of the second memory circuit $M_2$ 14 be $q_6, q_5, q_4, p_3, q_2, q_1$, respectively, then the input terminal 337 of the NAND gate 345 is connected to the output terminal 735 (output $\bar{q}_6$) of the FF $Q_6$ of the second memory circuit $M_2$ 14, the input terminal 338 of the NAND gate 345 is connected to the output terminal 721 (output $\bar{q}_5$) of the FF $Q_5$ of the secondary memory circuit $M_2$ 14, the input terminal 339 of the NAND gate 345 is connected to the output terminal (output $\bar{q}_4$) of the FF $Q_4$ of the secondary memory circuit $M_2$ 14, the input terminal 340 of the NAND gate 346 is connected to the output terminal 719 (output $\bar{q}_3$) of the FF $Q_3$ of the secondary memory circuit $M_2$ 14, the input terminal 341 of the NAND gate 346 is connected to the output terminal 718 (output $\bar{q}_2$) of the FF $Q_2$ of the secondary memory circuit $M_2$ 14, and the input terminal 342 the NAND gate 346 is connected to the output terminal 717 (output $\bar{q}_1$) of the FF $Q_1$ of the secondary memory circuit $M_2$ 14. The outputs from the NAND gates 345, 346 are applied to a NOR gate 348 as its input and these two NAND gates 345, 346 and one NOR gate 348 operate as a six input AND gate.

Let the outputs from the $Q_6$, $Q_5$, $Q_4$, $Q_3$, $Q_2$ and $Q_1$ be $q_6$, $q_5$, $q_4$, $q_3$, $q_2$ and $q_1$, respectively, then if the outputs from the second memory circuit $M_2$ 14 is (0 0 0 0 0 0), that is, $q_6 = 0$, $q_5 = 0$, $q_4 = 0$, $q_3 = 0$, $q_2 = 0$ and $q_1 = 0$, from the NOR gate 348 is delivered an output which is applied through a NOR gate 349 to the DATA terminal of the DATA-EF 353.

The clock input terminal 352 of the DATA-EF 353 is connected through a terminal 351 and the input terminal 119 of the $FF_1$ 109 of the frequency divider circuit 2 shown in FIG. 2 to the terminal 154 and always applied with $\phi_0$. At the time of raising this clock pulse $\phi_0$, the value of the DATA terminal E 350 is delivered, after one half period of $\phi_0$, to the output terminal F 354. This output terminal F 354 is connected to the input terminal of a NOR gate 356. The clock pulse terminal 352 is connected to the other input terminal 355 of the NOR gate 356. If an input is applied to the DATA terminal E, the DATA-FF 353 and NOR gate 356 cause a set pulse to be produced, after one half period of $\phi_2$, at the second hand position 0 (or 60). The NOR gate 356 is connected through an inverter 357 and terminal 358 to the input terminal 359 of a normal and reverse discriminator circuit 8.

Figure 8:
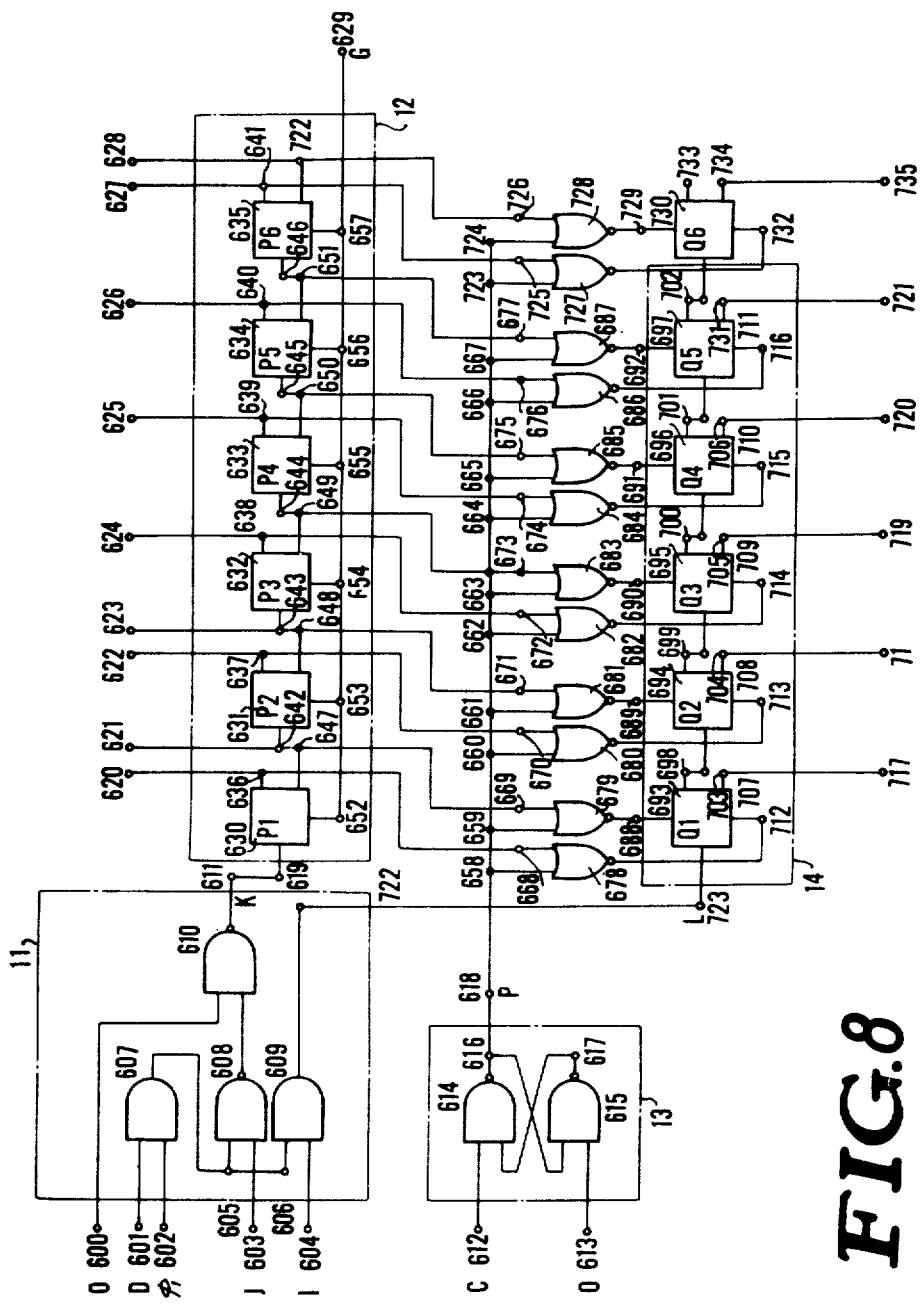
FIG. 8 is a circuit diagram of the electrical components of the output change-over circuit, second gate circuit and second memory circuit shown in FIG. 1.

To the input terminals of NAND gates 373, 374 are applied the outputs from respective DATA-FF of the first memory circuit $M_1$ 12 (see FIG. 8). The input terminal 367 of the NAND gate 373 is connected to the output terminal 628 (output $p_6$) of the FF $P_6$ of the first memory circuit $M_1$ 12, the input terminal 368 of the NAND gate 373 is connected to the output terminal 626 (output $p_5$) of the FF $P_5$ of the first memory circuit $M_1$ 12, the input terminal 369 of the NAND gate 373 is connected to the output terminal 625 (output $p_4$) of the FF $P_4$ of the first memory circuit $M_1$ 12, the input terminal 370 of the NAND gate 374 is connected to the output terminal 624 (output $p_3$) of the FF $P_3$ of the first memory circuit $M_1$ 12, the input terminal 371 of the NAND gate 374 is connected to the output terminal 622 (output $p_2$) of the FF $P_2$ of the first memory circuit $M_1$ 12, and the input terminal 372 is connected to the output terminal 620 (output $p_1$) of the FF $P_1$ of the first memory circuit $M_1$ 12. The outputs from the NAND gates 373, 374 are applied to a NOR gate 375 as its input and these two NAND gates and one NOR gate operate as one six input AND gate.

If respective outputs from the first memory circuit $M_1$ 12 are given by (0 1 1 1 1 1), that is, $P_6 = 0$ ($p_6 = 1$), $P_5 = 1$, $P_4 = 1$, $P_3 = 1$, $P_2 = 1$, $P_1 = 1$ (the second hand position 31), from the NOR gate 375 is delivered an output. The output terminal 376 of the NOR gate 375 is connected through an inverter 377 to the other input terminal 360 of the normal and reverse discriminator circuit 8.

The normal and reverse discriminator circuit 8 is composed of a RSI-FF constructed by two NAND gates 361, 362. As described above, the input terminal 359 of the NAND gate 361 is connected to the output terminal 358 of the inverter 357 and to the input terminal 360 of the NAND gate 362 is connected the output terminal of the inverter 377 (see FIG. 5).

The outputs from the detector circuit 7 cause the output from the NAND gate 361 take 1 at the time of the second hand position 0 and to take 0 at the time of the second hand position 31, thereby discriminating normal rotation and reverse rotation.

The output terminal 363 of the NAND gate 361 is connected through a terminal I 365 to the input terminal 429 of the conversion and change-over circuit 9 shown in FIG. 6 and the output terminal 364 of the NAND gate 362 is connected through a terminal J 366 to the input terminal 430 of the conversion and change-over circuit 9 shown in FIG. 6. In addition, the output terminal 363 of the NAND gate 361 is connected through the terminal I 365 to the input terminal 604 of the changover circuit 11 (see FIG. 8) and the output terminal 364 of the NAND gate 362 is connected through the terminal J 366 to the input terminal 603 of the changeover circuit 11 (see FIG. 8).

As shown in FIG. 6, the conversion and change-over circuit 9 is composed of four AND gates and two sets of AND-OR Select gates.

The input terminal 405 of an AND gate 417 is connected through a terminal 404 to the output terminal D 322 of the first gate circuit $G_16$, the input terminal 406 of the AND gate 417 is connected through a terminal 402 to the output terminals 122, 134 (output $\phi_1$) of the $FF_1$ 109 of the frequency divider circuit 2, and the input terminal 407 of the AND gate 417 is connected through a terminal 400 to the output terminals 124, 136 (output $\bar{\phi}_2$) of the $FF_2$ 110 of the frequency divider circuit 2. The input terminal 408 of the AND gate 418 is connected to the terminal 404, the input terminal 409 is connected to the output terminals 121, 133 (output $\bar{\phi}_1$) of the $FF_1$ 101 of the frequency divider circuit 2, and the input terminal 410 is connected to the terminal 400 (input $\bar{\phi}_2$). The input terminal 411 of an AND gate 419 is connected to the terminal 404, the terminal 412 is connected to the terminal 402, and the input terminal 413 is connected through a terminal 401 to the output terminals 123, 135 (output $\phi_2$) of the $FF_2$ 110 of the frequency divider circuit 2. The input terminal 414 of an AND gate 420 is connected to the terminal 404, the terminal 415 is connected to a terminal 403 (input $\bar{\phi}_1$), and the input terminal 416 is connected through the terminal 401 to the output terminals 123, 135 (output $\phi_2$) of the $FF_2$ of the frequency divider circuit 2.

The above-mentioned four AND gates 417, 418, 419, 420 is a waveform conversion circuit which can obtain four sets of pulse series for use in fast correction. The output from the AND gate 417 is given by ①$\phi'_1 = \bar{\phi}_1 \cdot \bar{\phi}_2$, the output from the AND gate 418 is given by ②$\phi'_2 = \phi_1 \cdot \bar{\phi}_2$, the output from the AND gate 419 is given by ③$\phi'_3 = \bar{\phi}_1 \cdot \phi_2$, and the output from the AND gate 420 is given by ④$\phi'_4 = \phi_1 \cdot \phi_2$. The pulses are produced in the order of ①$\phi'_1$, ②$\phi'_2$, ③$\phi'_3$, and ④$\phi'_4$ (see FIG. 6).

The output terminal 421 of the AND gate 417 is connected to the input terminal 433 of the second AND gate 448 of a first AND-OR Select gate and to the input terminal 436 of the first AND gate 449 of a second AND-OR Select gate. The output terminal 423 of the AND gate 419 is connected to the input terminal 432 of the first AND gate 447 of a first AND-OR Select gate and to the input terminal 437 of the second AND gate 450 of a second AND-OR Select gate. The input terminals 431, 435 of the AND gates 447, 449 are connected through the terminal 429 to the output terminal I 365 of the normal and reverse discriminator circuit 8, and the input terminals 434, 438 of the AND gates 448, 450 are connected through the terminal 430 to the other output terminal J 366 of the normal and reverse discriminator circuit 8.

Figure 7:
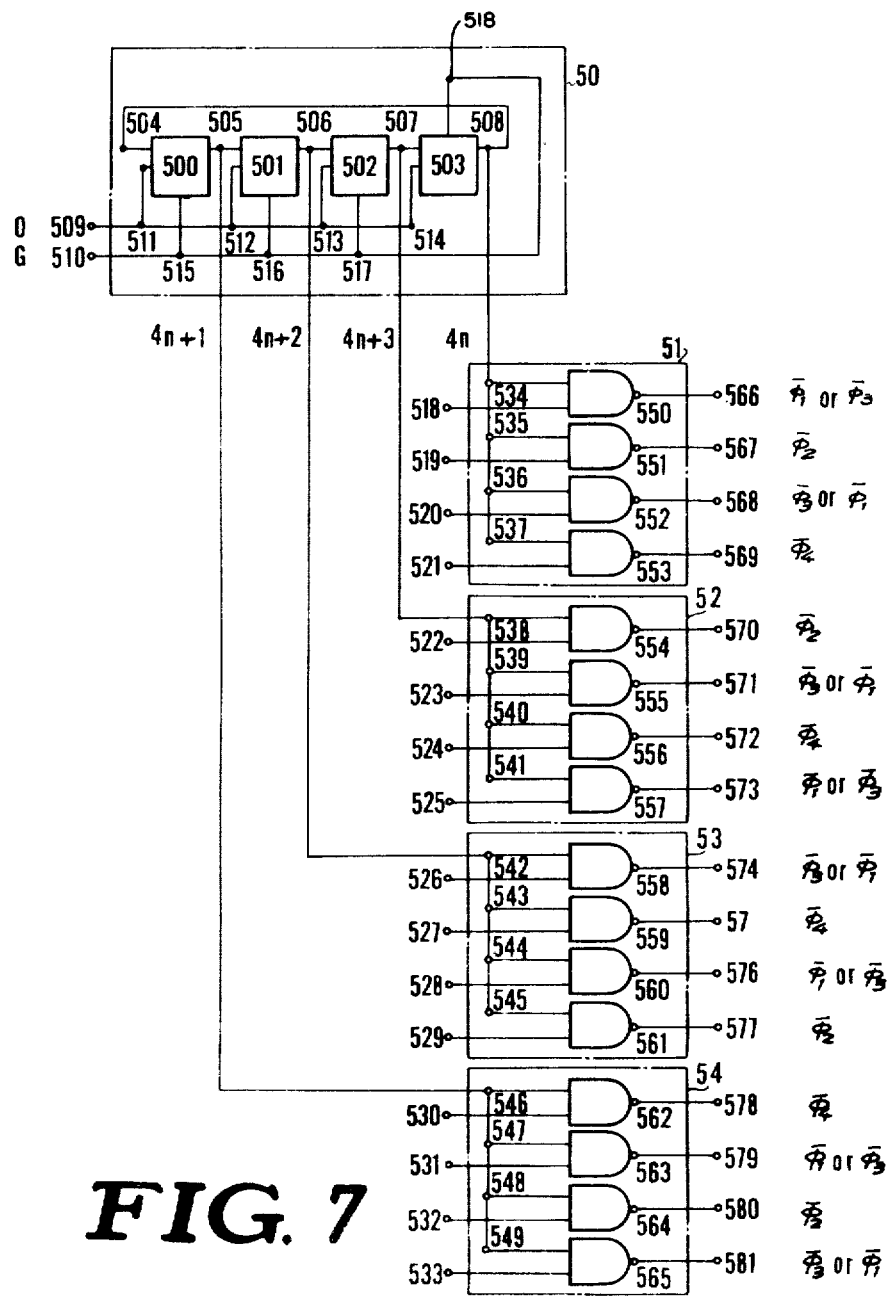
FIG. 7 is a circuit diagram of the electrical components of the fast-correction pulse-selector circuit and ring counter of arbitrary number four shown in FIG. 1.

The output terminals of the above-mentioned fast correct wave from conversion and change-over circuit 9 (FIG. 6) are connected to the input terminals of the pulse selector circuit 10 (FIG. 7).

The pulse selector circuit 10 shown in FIG. 1 is composed of a ring counter 50 of arbitrary number four and four sets of gate blocks 51, 52, 53, 54 each consisting of a NAND gate.

The driving pulse consisting of four pulse series ①$\phi'_1$, ②$\phi'_2$, ③$\phi'_3$ and ④$\phi'_4$ is used so that it is necessary to select pulse series to be applied at first to the driving circuit at the time of fast correction. The ring counter 50 of arbitrary number four serves to memorize the last pulse under steady state prior to the fast correction. At the time of normal rotation and fast correction, the pulses in the next pulse series are selected as the fast correction and normal driving pulses. At the time of reverse rotation and fast correction the conversion and change-over circuit shown in FIG. 6 serves to turn over the above-mentioned first pulse series ① $\phi'_1$ and the third pulse series ③ $\phi'_3$ and reverse the order of pulses. These pulses reversed in order are applied to the driving circuit.

In the ring counter of arbitrary number four 50, reference numerals 500, 501, 502 and 503 designate DATA-FF, respectively. The output terminal of the FF 500 is connected to the DATA input terminal 505 of the FF 501, the output terminal of the FF 501 is connected to the DATA input terminal 506 of the FF 502, the output terminal of the FF 502 is connected to the DATA input terminal 507, and the output terminal of the FF 503 is connected to the DATA input terminal 504 of the FF 500. Each of the clock input terminals 511, 512, 513, 514 of the FF is connected through a terminal 509 to the output terminal 219 (output $\phi$) of the waveform conversion circuit 3 (FIG. 3), and each of reset terminals 515, 516, 517 of the FF 500, 501, 502 and the reset terminal 518 of the FF 503 are connected through a terminal 510 to the output terminal 358 G of the detector circuit 7 (FIG. 5).

Each of the input terminals 534, 535, 536, 537 of each of the NAND gates 550, 551, 552, 553 of the first gate block 51 is corrected to the output terminal 508 of the FF 503, each of the input terminals 538, 539, 540, 541 of each of NAND gates 554, 555, 556, 557 of the second gate block 52 is connected to the output terminal 507 of the FF 502, each of input terminals 542, 543, 544, 545 of each of NAND gates 558, 559, 560, 561 of the third gate block 53 is connected to the output-terminal 506 of the FF 501, and each of input terminals 546, 547, 548, 549 of each of NAND gated 562, 563, 564, 565 of the fourth gate block 54 is connected to the output terminal 505 of the FF 500.

The input terminal 518 of the NAND gate 550 of the first gate block 51 is connected to the output terminal 459 (output $\phi'$ or $\phi'_3$) of the fast correction conversion and change over circuit 9 (FIG. 6), the input terminal 519 of the NAND gate 551 is connected to the output terminal 426 (output $\phi'2$), the input terminal 520 of the NAND gate 552 is connected to the output terminal 460 (output $\phi'3$), and the input terminal 521 of the NAND gate 553 is connected to the output terminal 428 (output $\phi_4$). At the time of the second hand position $4n$ ($n = 0, 1, 2 \ldots$ ), if the fast correction is effected, only the output from the FF R$_4$ 503 becomes 1 and the other outputs become 0. As a result, if $4n$ 31, the normal rotation fast correction pulse is produced in the order of ① $\bar{\phi}'_1 = \phi_1 + \phi_2$ ($=\overline{\bar{\phi}_1 . \bar{\phi}_2}$) from the output terminal 566 of the NAND gate 550, ② $\bar{\phi}'_2 = \bar{\phi}_1 + \phi_2$ ($=\overline{\phi_1 . \bar{\phi}_2}$) from the output terminal 567 of the NAND gate 551, ③ $\bar{\phi}'_3 = \phi_1 + \bar{\phi}_2$ ($=\overline{\bar{\phi}_1 . \phi_2}$) from the output terminal 568 of the NAND gate 552, and ④ $\bar{\phi}'_4 = \phi_1 + \bar{\phi}_2$ ($= \overline{\phi_1 . \phi_2}$) from the output terminal 569 of the NAND gate 553. If $4n<31$, a reverse rotation is effected to interchange ① $\bar{\phi}'_1$ with ③ $\bar{\phi}'$ 3. Thus, ③ $\bar{\phi}'_3$ is delivered from the output terminal 566, and ① $\bar{\phi}'_1$ is delivered from the output terminal 568. The output terminals 567, 569 remain as they were at the time of the normal rotation and $\bar{\phi}'_2$, $\bar{\phi}'_4$ are delivered from the output terminals 567, 569. That is, the fast correction pulses are generated in the order of ①,②,③,④ at the time of the normal rotation and ③,②,①,④ at the time of the reverse rotation.

The input terminal 522 of the NAND gate 554 of the second gate block 52 is connected to the output terminal 426 (output $\bar{\phi}'_2$) of the fast correction conversion and change-over circuit 9 (FIG. 6), the input terminal 523 of the NAND gate 555 is connected to the output terminal 460 (output $\phi'_3$ or $\phi'_1$), the input terminal 524 of the NAND gate 556 is connected to the output terminal 428 (output $\phi'_4$), and the input terminal 525 of the NAND gate 557 is connected to the output terminal 459 ($\phi'_1$ or $\phi'_3$). At the second hand position $4n + 3$ ($n = 0, 1, \ldots$ ), if the fast correction is effected, each output termnal 570, 571, 572, 573 delivers pulses in the order of ② $\bar{\phi}'_2$, ③ $\bar{\phi}'_3$, ④ $\bar{\phi}'_4$, ① $\bar{\phi}'_1$ at the normal rotation, and pulses in the order of ② $\phi'_2$, ① $\bar{\phi}'_1$, ④ $\bar{\phi}'_4$, ③ $\bar{\phi}'_3$ at the reverse rotation.

The input terminal 526 of the NAND gate 558 of the third gate block 53 is connected to the output terminal 460 (output $\phi'_3$ or $\phi'_1$) of the conversion and change-over circuit, the input terminal 527 of the NAND gate 559 is connected to the output terminal 428 (output $\phi'_4$), the input terminal 528 of the NAND gate 560 is connected to the output terminal 459 (output $\phi'_1$ or $\phi'_3$), and the input terminal 529 of the NAND gate 561 is connected to the output terminal 426 (output $\phi'_2$). At the second hand position $(4n + 2)$ ($n + 0, 1, \ldots$ ), if the fast correction is effected, each of output terminals 574, 575, 576, 577 of the NAND gate delivers pulses in the order of ③ $\bar{\phi}'_3$, ④ $\bar{\phi}'_4$, ① $\bar{\phi}'_1$, ② $\bar{\phi}'_2$ at the normal rotation and in the order of ① $\bar{\phi}'_1$, ④ $\bar{\phi}'_4$, ③ $\bar{\phi}'_3$, ② $\bar{\phi}'_2$ at the reverse rotation.

The input terminal 530 of the NAND gate 562 of the fourth gate block 54 is connected to the output terminal 428 (output $\phi'_4$) of the conversion and change-over circuit, the input terminal 531 of the NAND gate 563 is connected to the ontput terminal 459 (output $\phi'_1$ or $\phi'_3$), the input terminal 532 of the NAND gate 564 is connected to the output terminal 426 (output $\phi'_2$), and the input terminal 533 of the NAND gate 565 is connected to the output terminal 460 (output $\phi'_3$). At the second hand position $4n + 1$ ($n = 0, 1, 2 \ldots$ ), if the fast correction is effected, from each of output terminals 578, 579, 580, 581 of the NAND gates is delivered a pulse in the order of ④$\bar{\phi}'_4$, ①$\bar{\phi}'_1$, ②$\bar{\phi}'_2$, ③$\bar{\phi}'_3$, at the time of normal rotation and in the order of ④$\bar{\phi}'_4$, ③$\bar{\phi}'_3$, ②$\bar{\phi}'_2$, ①$\bar{\phi}'_1$ at the time of reverse rotation.

The output terminals of the pulse selector circuit 10 (FIG. 7) are connected to the input terminals of the NOR gates of the driving circuit (FIG. 4). The output terminals 566, 567, 568, 569 are connected to the input terminals 271, 275, 260, 264, respectively, the output terminals 570, 571, 572, 573 are connected to the input terminals 272, 276, 261, 265, respectively, the output terminals 574, 575, 576, 577 are connected to the input terminals 273, 277, 262, 266, respectively, the output terminals 578, 579, 580, 581 are connected to the input terminals 274, 278, 263, 267, respectively.

As shown in FIG. 8, the chang-over circuit 11 is composed of two AND gates and two NAND gates. The input terminal 600 of the NAND gate 610 is connected to the output terminal 0 219 (output $\phi$) of the wave form conversion circuit (FIG. 3), the input terminal 601 of the AND gate 607 is connected to the output termnal D 322 of the first gate 6 (FIG. 5), and the input terminal 602 is connected to the output terminal 133 (output $\phi_1$) of the frequency divider circuit 2 (FIG. 2). The input terminal 603 of the NAND gate 608 is connected to the output terminal J 366 of the discriminator circuit 8 (FIG. 5), the input terminal 604 of the NAND gate 609 is connected to the output terminal I 365, and the output terminal of the AND gate 607 is connected to the input terminal 605 of the NAND gate 608 and to the input terminal 606 of the NAND gate 609. At the time of normal rotation, the NAND gate 608 is closed and at the time of reverse rotation, the AND gate 609 is closed. As a result, $\phi_1$ is applied to the first memory circuit $M_1$ 12 or to the second memory circuit $M_2$ 14.

As shown in FIG. 8, the first memory circuit $M_1$ 12 is an addition binary counter which makes use of six JK-FF. These six JK-FF are connected in cascade and a negation output is supplied to the succeeding stage as its clock input.

The clock input terminal 619 of the JK-FF 630 is connected to the output terminal K 611 of the change-over circuit 11, the output terminal 647 of the JK-FF 630 is connected to the clock input terminal 642 of the JK-FF 631, the output terminal 648 is connected to the clock input terminal 643 of the JK-FF 632, the output terminal 649 is connected to the clock input terminal 644 of the JK-FF 633, the output terminal 650 is connected to the input terminal 645, and the output terminal 651 is connected to the input terminal 646. The reset terminals 652, 653, 654, 655, 656, 657 of the JK-FF are connected through a terminal 629 to the output terminal G 358 of the detector circuit 7.

As shown in FIG. 8, the second gate circuit $G_2$ 13 is a RSI-FF composed of two NAND gates 614, 615. The input terminal 613 of the NAND gate 615 is connected to the output terminal 0 219 (output $\phi$) of the waveform conversion circuit 3 (FIG. 3) and the input terminal 612 of the NAND gate 614 is connected to the output terminal 314 of the fast correction set circuit 5 (FIG. 5).

At the steady state, the output terminal P 618 of the first gate circuit is reset to 0 by means of $\bar{\phi}$. As shown in FIG. 8, the second memory circuit $M_2$ 14 is a substraction binary counter which makes use of six JK-FF. These six JK-FF are connected in cascade and each output is supplied to the secceeding stage as its clock input.

The clock input terminal L 723 of the FF 693 is connected to the output terminal 722 of the chang-over circuit 11, the output terminal 698 is connected to the clock input terminal 703 of the FF 694, the output terminal 699 is connected to the clock input terminal 704 of the FF 695, the output terminal 700 is connected to the clock input terminal 705 of the FF 696, the output terminal 701 is connected to the clock input terminal 706 of the FF 697, and the output terminal 702 is connected to the clock input terminal 731 of the FF 730.

The input terminals 658, 679 of the NOR gates 678, 679, the input terminals 660, 661 of the NOR gates 680, 681, the input terminals 662, 663 of the NOR gates 682, 683, the input terminals 664, 665 of the NOR gates 684, 685, the input terminals 666, 667 of the NOR gates 686, 687, and the input terminals 723, 724 of the NOR gates 727, 728 are connected to the output terminal 618 of the second gate circuit 13, respectively.

The input terminal 668 of the NOR gate 678 is connected to the output terminal 636 of the $FF_1$ $P_1$ of the first memory circuit $M_1$ 12, the input terminal 669 of the NOR gate 679 is connected to the output terminal 647 of the FF $P_1$, the output terminal of the NOR gate 678 is connected to the reset terminal 712 of the FF $Q_1$ of the second memory circuit 14, and the output terminal of the NOR gate 679 is connected to the set terminal 688. The input terminal 670 of the NOR gate 680 is connected to the output terminal 637 of the FF $P_2$, the input terminal 671 of the NOR gate 681 is connected to the output terminal 648 of the FF $P_2$, the output terminal of the NOR gate 680 is connected to the reset terminal 713 of the FF $Q_2$, and the output terminal of the NOR gate 681 is connected to the set terminal 689. The input terminal 672 of the NOR gate 682 is connected to the output terminal 638 of the FF $P_3$ 632, the input terminal 673 of the NOR gate 683 is connected to the output terminal 649 of the FF $P_3$ 632, the output terminal of the NOR gate 682 is connected to the reset terminal 714 of the FF $Q_3$, and the output terminal of the NOR gate 683 is connected to the set terminal 690. The input terminal 674 of the NOR gate 684 is connected to the output terminal 639 of the FF $P_4$, the output terminal 695 of the NOR gate 685 is connected to the output terminal 650 of the FF $P_4$, the output terminal of the NOR gate 684 is connected to the reset terminal 715 of the FF $Q_4$, and the output terminal of the NOR gate 685 is connected to the set terminal 691.

The input terminal 676 of the NOR gate 686 is connected to the output terminal 640 of the FF $P_5$, and the input terminal 677 of the NOR gate 687 is connected to the output terminal 651 of the FF $P_5$. The output terminal of the NOR gate 686 is connected to the reset terminal 716 of the FF $Q_5$, and the output terminal of the NOR gate 687 is connected to the reset terminal 697. In addition, the input terminal 725 of the NOR gate 727 is connected to the output terminal 641 of the FF $P_6$, and the input terminal 726 of the NOR gate 728 is connected to the output terminal 722 of the FF $P_6$. The output terminal of the NOR gate 772 is connected to the reset terminal 732 of the FF $Q_6$, and the output terminal of the NOR gate 728 is connected to the set terminal 729. In the steady state, the output from the second gate 13 is 0 and the value of the first memory circuit $M_1$ 12 is set to the second memory circuit $M_2$ 14, whereby the value of the circuit $P_1$ is made equal to the value of $Q_1$, the value of the circuit $P_2$ is made equal to the value of $Q_2$, the value of the circuit $P_3$ is made equal to the value of $Q_3$, the value of the circuit $P_4$ is made equal to the value of $Q_4$, the value of the circuit $P_5$ is made equal to the value of $Q_5$, and the value of the circuit $P_6$ is made equal to the value of $Q_6$.

The fast correction set causes the output from the second gate to turn to 1 so that the output each NOR becomes 0. As a result, the first memory circuit is separated from the second memory circuit, thus making these two circuit counters independent from each other.

Figure 11A:
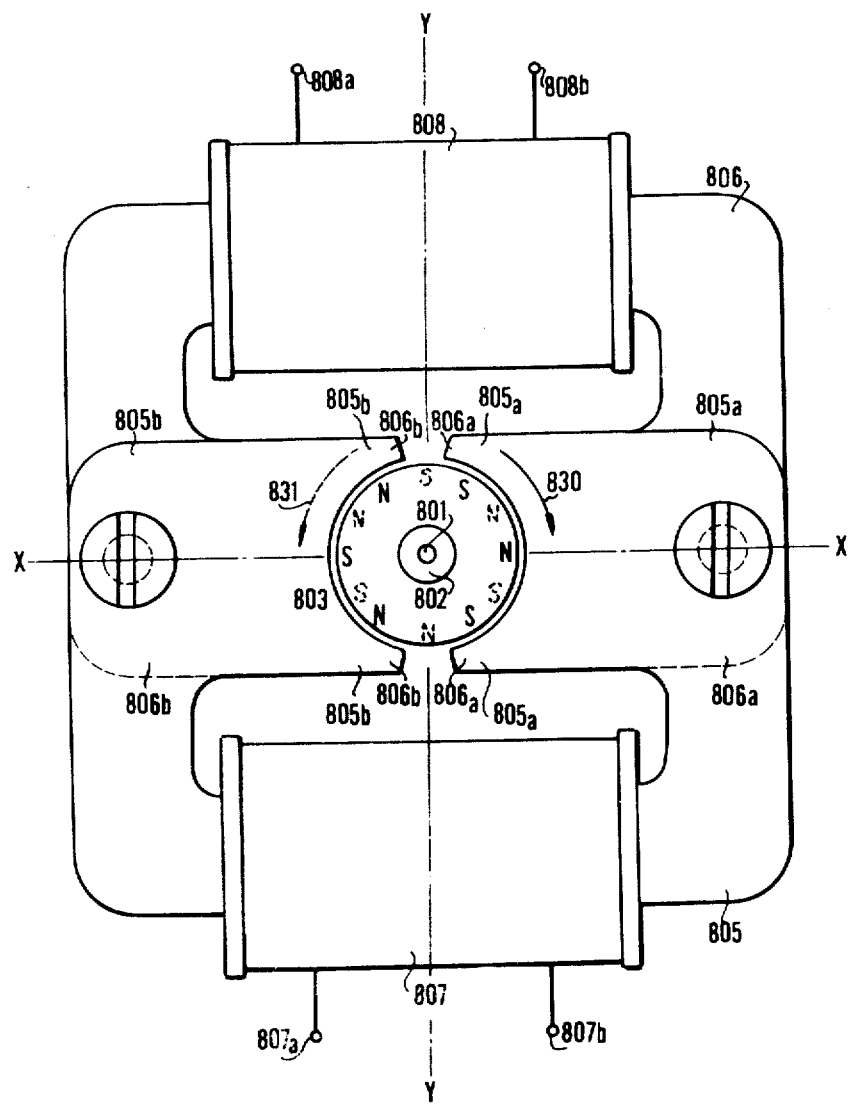
FIG. 11A is a plan view showing one embodiment of the reversible pulse motor for use in a timepiece according to the invention.

FIGS. 11A, 12 and 13 show one embodiment of the reversible pulse motor according to the invention. Reference numeral 801 designates a rotary shaft, 802 a non-magnetic supporting member for supporting a permanent magnet, 803 and 804 permanent magnet rotors such each provided at its outer peripheral side surface with a plurality of magnetic poles, 805 a magnetic stator, 805a, 805b stator magnetic poles, 807 an exciting coil (the exciting coil 243 of the driving circuit 4 shown in FIG. 4), 807a, 807b input terminals of the exciting coil 807 (the input terminals a 242, c 245 shown in FIG. 4), 806 another stator, 806a, 806b stator magnetic poles of another stator 806, 808 its exciting coil (the exciting coil 244 shown in FIG. 5), and 808a, 808b input terminals of the exciting coil 808 (the input terminals b 241, d 246 shown in FIG. 4). Reference numerals 809, 812 designate set screws for the stators, and (810, 811 spacers for aligning the stators 805, 806 in parallel. As shown in FIG. 13, the rotor is composed of two disc-shaped permanent magnets 803, 804 spaced apart from each other in the axial direction and such provided at its outer peripheral lateral surface with six magnetic poles spaced apart from each other by an electrical angle of 90° (space angle of $\alpha = 60°$ and $\alpha/2 = 30°$) in a rotating direction. These two permanent magnets 803, 804 are secured through the supporting member 802 to the rotary shaft 801.

The permanent magnet 803 magnetically engages through a small air gap with the stationary magnetic poles 805a, 805b and the permanent magnet 804 magnetically engages through a small air gap with the stationary magnetic poles 806a, 806b. The stators 805, 806 are provided with the exciting coils 807, 808 wound around them, respectively. The table points of the pulse motor according to the invention are two times larger than the number of the magnetic poles of the rotator, that is 12. The stator magnetic poles are concentrially arranged with respect to the rotary shaft and surround the rotor with an air gap remained therebetween.

Referring to FIG. 11A, the S pole of the permanent magnet 803 engages with the forward end portions $805a_1$, $805a_2$ of the stator pole 805a and the N pole of the permanent magnet 803 engages with the forward poles $805b_1$, $805b_2$ of the stator pole 805. At this instant, the S and N poles of the permanent magnet 804 are located one Y—Y line, which the remaining four S and N poles engages with the center part of the stator poles 806b, 806 a. This center part has substantially no change in its magnetic reluctance so that the coercive force of the permanent magnet 804 is small, and as a result, the rotor is held by the coercive force of the permanent magnet 803. The S pole of the permanent magnet 804 is located on Y—Y line between $806a_2$ and $806b_2$ and the N pole of the permanent magnet 804 is located on Y—Y line between $806a_1$ and $806b_1$.

Under such condition, if the exciting coil 808 is energized with a positive voltage and a magnetic flux flows to magnetize the portion 806a of the stator 806 to the N pole and the portion 806b to the S pole, the rotor is rotated by a space angle of 30° in a direction shown by an arrow 830 and then stopped. The value of the applied voltage and the pulse width are so selected that the rotor can rotate against the above mentioned coercive force. At this instance, the N and S poles of the permanent magnet 803 arrive at Y—Y line between $805a_2$ and $805b_2$ and between $805a_1$ $805b_1$, respectively. If the exciting coil 807 is so wound that the positive applied voltage can make the poles 805a, 805b of the stator 805 S pole and N pole, respectively, the rotor is further rotated by one step in the direction shown by the arrow 83. At this instant, the N and S poles of the permanent magnet 804 arrive at the line Y—Y between $806a_2$ and $806b_2$ and between $806a_1$ and $806b_1$, respectively. A negative voltage applied to the exciting coil 808 causes the rotor to rotate further by one step. At this instant, the S and N poles of the permanent magnet 803 are produced on the line Y—Y between $805a_2$ and $805b_2$ and between $805a_1$ and $805b_1$, respectively. If the exciting col 807 is applied with the negative voltage, the rotor is rotated in the direction shown by the arrow 830. The above operations are repeated.

Even if the exciting coils are excited in opposite sense, it is possible to rotate the rotor. At first, the exciting coil 808 is applied with a negative voltage, and the exciting coil 807 is applied with a negative voltage. Then, the exciting coil 808 is applied with the negative voltage and the exciting coil 807 is applied with the positive voltage. Thus, the rotor can be rotated in a direction shown by a dotted line arrow 831.

The reversible pulse motor for use in timepieces has a number of advantages. In the frst place, the motor is simple in constructions. Secondly, a constant air gap formed between the stator poles and the outer periphery of the rotor results in a small coersive force and hence the motor can be driven without consuming a large electric power. Third, the use of the same configuration of the stator poles makes it possible to precisely assemble the motor and hence to maintain the same property in both the normal and reverse rotations. Fourth, the rotor is simple in its configuration so that the permanent magnet can easily and uniformly be magnetized. Finally, the use of the two phase system allows a drive circuit to be used and a logic calculating circuit which are relatively simple and if the number of positive and negative steps of the pulse motor interlocked with the second hand with respect to the standard position is calculated and the stem is pushed by one touch, it is possible to rotate the rotor at a speed higher than the ordinary speed in a desired direction, return the second hand to zero and set the timepiece to any desired time.

As seen from the above, the number of poles of the permanent magnet of the rotor of the reversible pulse motor for use in timepiece according to the invention is not limited six.

It is also seen that two rotors may be aligned to the same electrical angle by displacing the stator poles in electrical angles.

The object of the invention may also be attained by applying the invention to a three phase pulse motor.

Figure 11B:
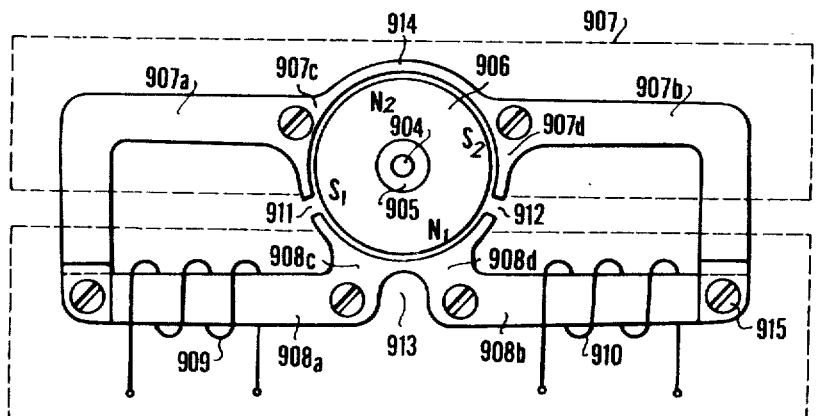
FIG. 11B is a plan view showing another embodiment of the reversible pulse motor for use in timepieces according to the invention.

In FIG. 11B is shown another embodiment of the reversible pulse motor according to the invention. In the present embodiment, use is made of one rotor member for the purpose of making the timepece very thin and particularly suitable for use in wrist watches.

Referring to FIG. 11B, reference numeral 904 designates a rotor shaft, 905 a rotor supporting member 96 a permanent magnet rotor provided at its side peripheral surface with four poles, 907 one of stators having an arcuate portion by which two stator portions are made integral with one body, 907a, 907b yokes of the stator 907, 907c 907d poles of the stator 907, and 908 another stator composed of yokes 908a, 908b made integral together and provided with stator poles 908c and 908d. The stator poles 907c, 908c are arranged to surround through substantially constant air gap the rotor 906 and magnetically opposed through a minute air gap 911 each other. Similarly, the stator poles 907d and 908d are arranged to surround through substantially constant air gap the rotor 906 and magnetically opposed through a minute air gap 912 each other. Thus, one of the magnetic circuits is closed by 907a - 907c - 908c - 908a and the other magnetic circuit is closed by 907b - 907d - 908d - 908b. The pole width of the stator poles 907c, 907d, 908c, 908d is made less than 360°/number of rotor poles. The air gap between 907c and 908c and the air gap between 907d and 908d are made at least one pole pitch, respectively. The pole width of the stator poles 908c, 908d is made ½pole pitch.

The rotor is at a standstill as shown in FIG. 11B and will now be rotated in a clockwise direction. In the position shown in FIG. 11B, the pole $S_1$ is attracted by the air gap 911, poles $N_1$, $S_2$ are attracted by the stator poles 908d, 907d, respectively, and the pole $N_2$ is opposed to the connecting member 914, and as a result, these poles are stabilized.

Figure 11C:
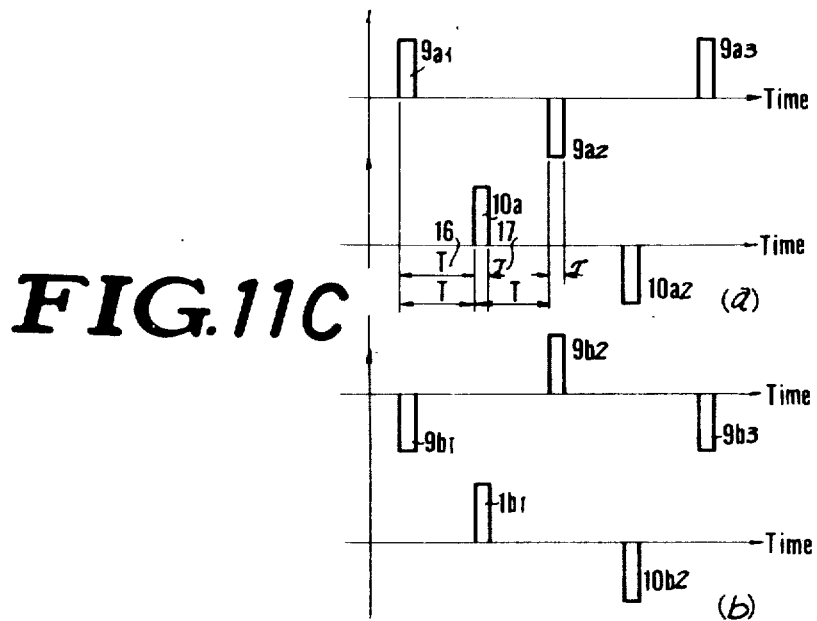
FIG. 11c is a waveform diagram of voltage pulses to be applied to the pulse motor shown in FIG. 11B, (a) showing the driving pulses for rotating the motor in clockwise direction and (b) showing the driving pulses for rotating the motor in counterclockwise direction.

Under such condition, if a pulse 9a, having a polarity shown in FIG. 11c is applied to the coil 909 and the direction of winding the coil 909 and the sense of applying the voltage to the coil 909 are so selected that the pole 907c is excited to the N pole and the pole 908c is excited to the S pole, the connecting member 914 and the connecting member having a groove 913, both being small in section, become large in their magnetic reluctance the magnetic flux produced by the exciting coil 909 flows through a magnetic circuit substantially closed by 907a - 907c - 908c - 908a. As a result, the pole $S_1$ is repulsed toward the pole 907c, the pole $N_1$ is repulsed toward the pole 908c, and the pole $S_2$ is repulsed toward the air gap 912. Under such condition, if a pulse 10a, shown in FIG. 11c is applied to the coil 910, the pole $S_2$ is repulsed toward the pole 908d, the pole $N_1$ becomes opposed to the air gap 911 and the pole $N_2$ becomes opposed to the pole 907d. The above operations will be repeated. In FIG. 11C - (a) are shown pulses for rotating the rotor in the clockwise direction and in FIG. 11C - (b) are shown pulses for rotating the rotor in the counter-clockwise direction. The pulse applied to the coil 909 shown in FIG. 11C - (a) is opposite in polarity to the pulse shown in FIG. 11C - (b).

As seen FIG. 11B, the motor according to the invention is of two phase motor whose stator is composed of a pair of stator portions arranged on substantially the same plane and rotor is not specially large in thickness. As a result, it is possible to obtain a thin type reversible pulse motor. The stator poles are arranged to continuously surround the rotor except the two air gaps so that the coersive force of the permanent magnet against the stator poles becomes small. Thus, the motor can be driven by a minute electric power. In addition, the motor is simple in construction.

Figure 14:
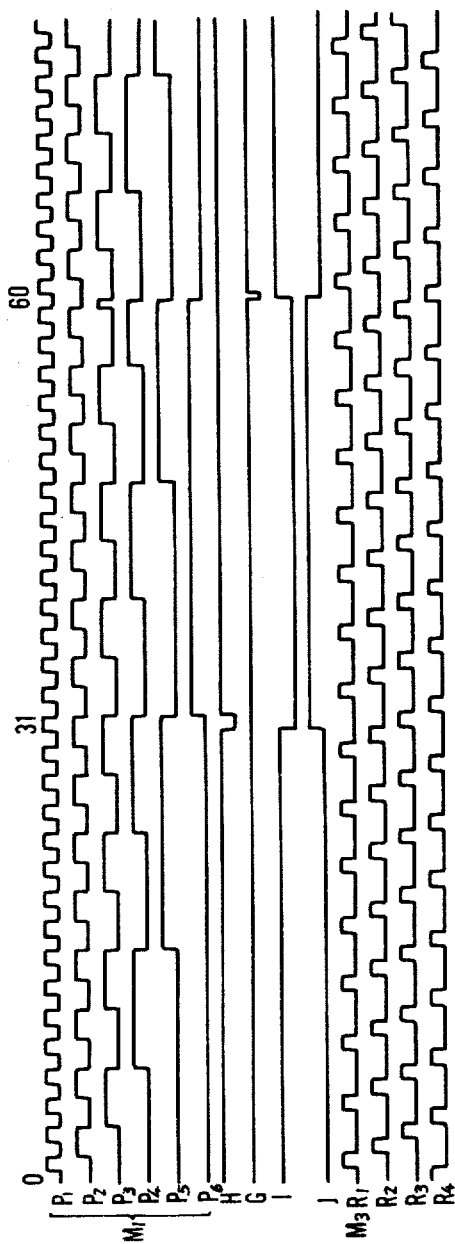
FIG. 14 is a waveform diagram showing the pulses delivered from the various electrical components in the steady state.
Figure 15:
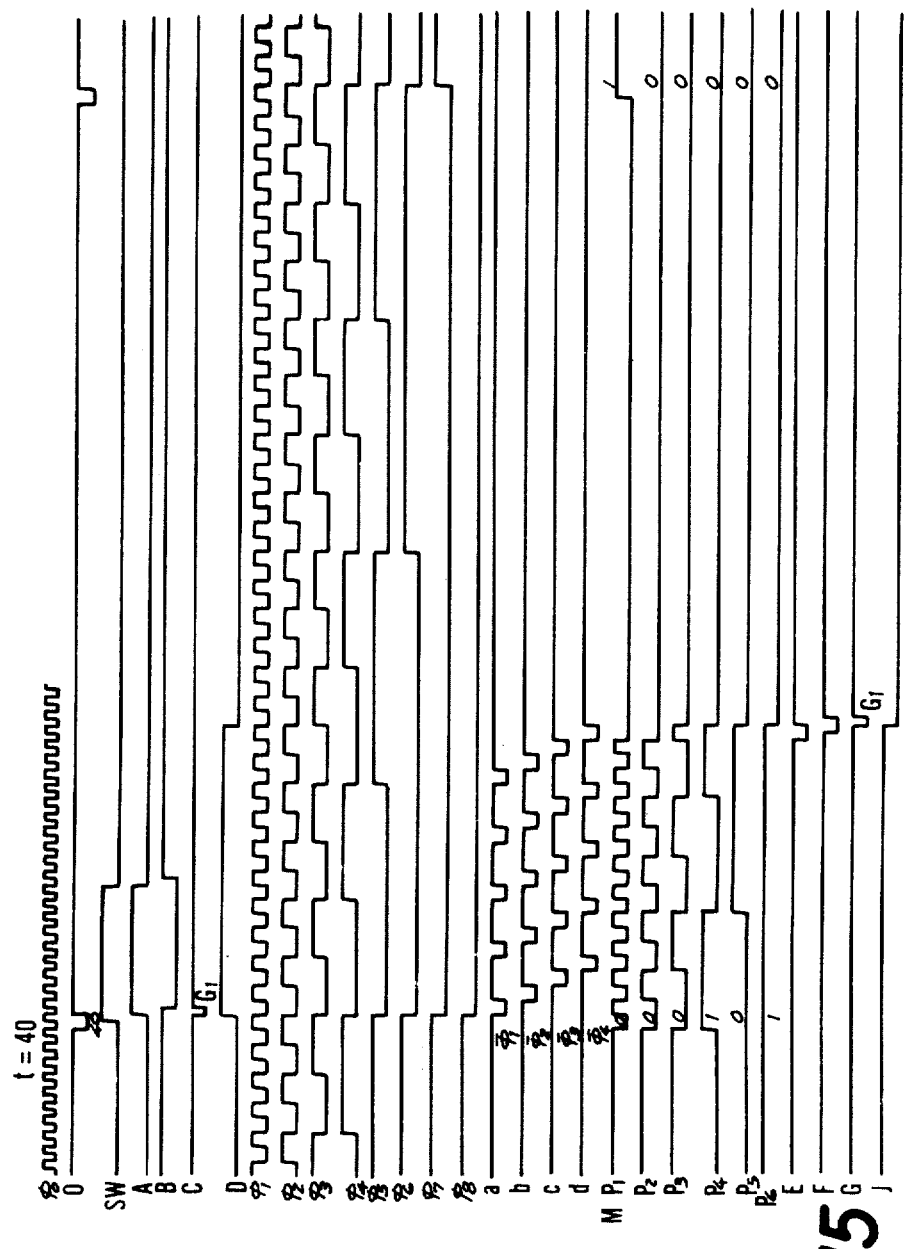
FIG. 15 is a waveform diagram illustrating the operation when the fast correction switch is closed when the second hand position is 40 seconds.
Figure 16:
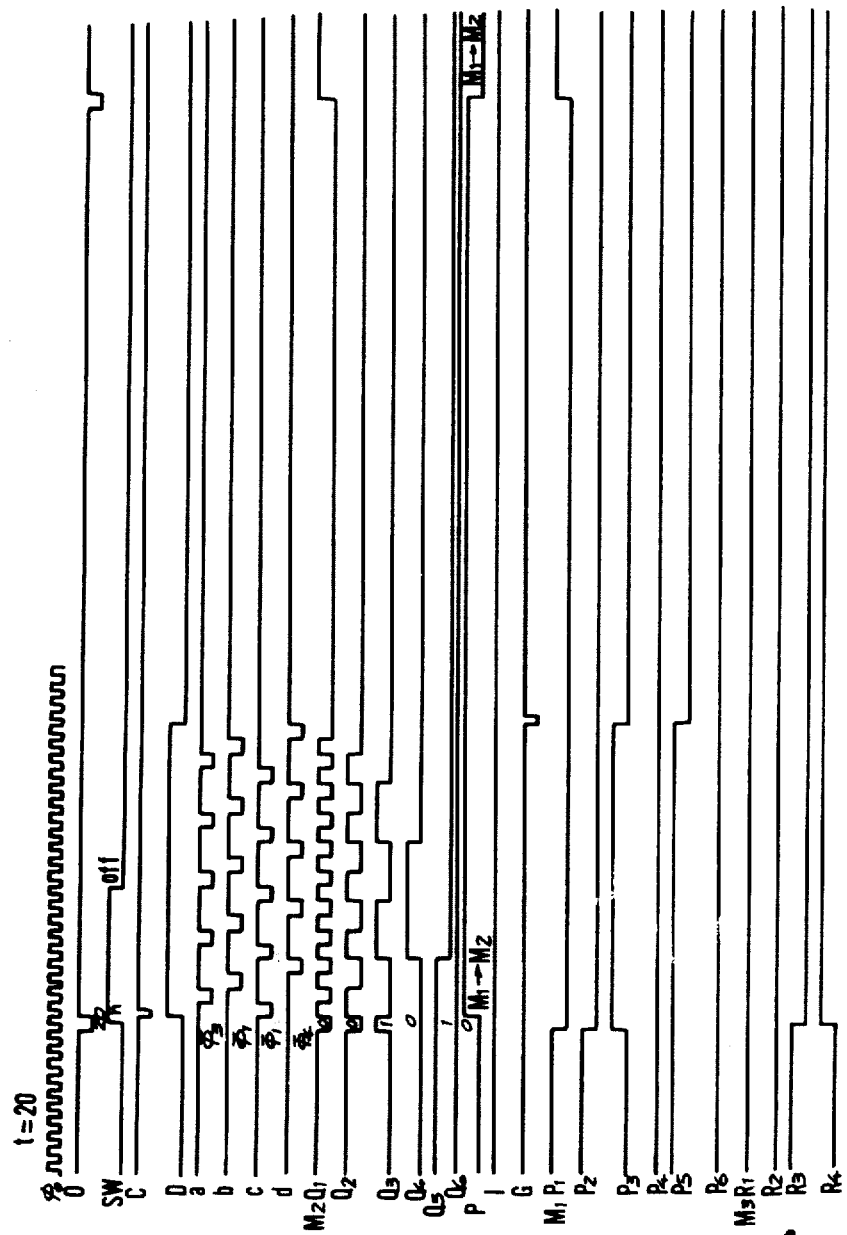
FIG. 16 is a waveform diagram illustrating the operation when the fast correction switch is closed when the second hand position is 20 seconds.

In FIG. 14 are shown pulses for explaining the operation of the pulse motor according to the invention in its steady state. In FIG. 15 are shown pulses for explaining the operation of the pulse motor according to the invention at the time of closing the fast correction switch when the second hand indicates 40 seconds. In FIG. 16 are shown pulses for explaining the operation of the pulse motor according to the invention at the time of closing the fast correction switch when the second hand indicates 20 seconds.

At first, the essentials of the operations will be described. In the steady state, the output from the oscillator circuit 1 shown in FIG. 1 is applied to the frequency divider circuit 2 whose output is applied to the wave form conversion circuit 3. The four pulse series converted by the circuit 3 are applied to the driving circuit 4 to rotate the reversible motor in its normal direction. The output from the conversion circuit 3 causes the first gate circuit $G_1$ 6 for producing the fast correction pulses to open, thereby preventing a generation of the fast connection pulses. In addition, the output from the conversion circuit 3 is applied to the pulse selector circuit 10 to select the driving coil terminal which is applied with the fast correction driving pulse in the first place at the time of fast correction. The output from the conversion circuit 3 is also applied to the first memory circuit $M_1$ 12 thus causing it to always memorize the second hand position. In addition, the output from the conversion circuit 3 is applied to the second gate circuit $G_2$ 13 to close it and set the value of the first memory circuit $M_1$ 12 to the second gate circuit $G_2$ 13. The detector circuit 7 connected to the output side of the first memory circuit $M_1$ 12 serves to produce its output at both the second hand positions 31 and 60. The output from the conversion circuit 3 at the second hand position 60 causes the first memory circuit $M_1$ 12 to be reset to 0 and causes the normal and reverse discriminator circuit 8 to be set to the reverse rotation side. The output from the conversion circuit 3 at the second hand position 31, that is, the output (0 1 1 1 1) causes the normal and reverse discriminator circuit 8 to be set to the normal rotation side. The output from this discriminator circuit 8 is applied to the fast correction waveform conversion and change-over circuit 9 and to the change-over circuit 11.

If the fast correction switch is pushed, the fast correction set pulse is generated to close the gate circuit $G_1$ 6 whereby the output from the frequency divider circuit 2 is applied to the fast correction conversion and change-over circuit 9. As a result, four fast correction pulse series are applied through the pulse selector circuit 10 to the driving circuit 4 such that the rotor is rotated in the normal direction at the second hand positions 31 to 59 and is rotated in the reverse direction at the second hand positions 1 to 30, thereby rotating the reversible motor in the normal or reverse direction. In addition, a portion of the output from the frequency divider circuit is applied through the change-over circuit 11 to the input side of the second memory circuit $M_1$ 14 at the second hand positions 31 to 59 and to the input side of the first memory circuit $M_2$ 14 at the second hand positions 1 to 30. In addition, the fast correction set pulse causes the frequency divider circuit 2 to be reset to 0 and causes the gate $G_2$ 13 to be opened, thereby separating the first and second memory circuits $M_1$ 12 and $M_2$ 14 from each other. In case of rotating the motor in the normal direction, the output is delivered from the detector circuit 7 when the second hand is positioned at 60 (correct time) to open the gate $G_1$ 6 thereby stopping the fast correction driving pulse and stopping the second hand at 0 position. In addition, the output from the detector circuit 7 causes the normal and reverse discriminator circuit 8 to be set to the reverse rotation side.

In case of rotating the motor in the reverse direction, the second memory circuit $M_2$ 14 operates as a subtraction counter. When the subtraction counter arrives at 0 (the second hand position 0), from the detector circuit 7 is delivered an output which is applied to the gate $G_1$ 6, thereby stopping the fast correction driving pulse and stopping the second hand at its 0 position. After one second from the fast correction reset time, the steady state driving output is produced and applied to the driving circuit 4. At the 0 position, the expected second hand starts its operation and arrives at its steady state operation.

The above operations will now be described in detail. Under the steady state, let the input $\phi_0$ to the circuit $FF_1$ 109 of the frequency divider circuit 2 (FIG. 2) be 64 Hz, the first output (0 point) from the conversion circuit (FIG. 3) becomes a rectangle pulse of 1 Hz whose pulse width is $1/64^{sec}$. This first output is applied to the first memory circuit $M_1$ 12 which is then operated as an addition counter to change its condition every one second in a manner illustrated in a truth table shown in FIG. 9. Use is made of six FF circuits so that the first memory circuit $M_1$ 12 is brought into the original condition at 64th pulse without effecting the exterior reset. Then the exterior reset is effected such that the first memory circuit $M_1$ 12 is brought into the original condition at the 60th pulse and that each condition corresponds to the second hand position.

In FIG. 14, if the second hand position arrives at 31 and the values of the first memory circuit $M_1$ 12 are given by $p_1 = 1, p_2 = 1, p_3 = 1, p_4 = 1, p_5 = 1, p_6 = 0$, that is, $M_1 = 0\ 1\ 1\ 1\ 1\ 1$, all of the inputs to the NAND gates 373, 374 become 1. As a result, a reset pulse is delivered to the output terminal 376 of the NOR gate 375 and is applied through the inverter 377 to the input terminal H of the discriminator circuit 8, thereby setting the output from the discriminator circuit 8 to the forward rotation side (I = 0, J = 1).

If the second hand position arrives at 60 and the value of the first memory circuit $M_1$ 12 are given by $p_1 = 0, p_2 = 0, p_3 = 1, p_4 = 1, p_5 = 1, p_6 = 1$, that is, $M_1 = 1\ 1\ 1\ 1\ 0\ 0$, all of the inputs to the NAND gates 343, 344 become 1 and the input E to the DATA-EF 353 passes the NOR gate 349 and become $1 \to 0$. This input E is delivered to the output side F after one half period of $\phi_0$, that is, $1/128^{sec}$. This output F and $\phi_0$ cause the output from E to lag by one period of $\phi_0$, that is, lagged by 1 pulse to appear at G. This output is applied to the reset terminal 629 of the first memory circuit $M_1$ 12 thus making $M_1 = 0\ 0\ 0\ 0\ 0\ 0$. This output G causes the discriminator circuit 8 to be inverted to set it to the reverse rotation side (I = 1, J = 0).

The output 0 from the conversion circuit 9 is applied to the ring counter of arbitrary number four $M_3$ 50 of the selector circuit 10 which can memorize the kinds of driving pulses applied to it every 1 second as shown in FIG. 9. In the second hand position, $(4n), (4n + 1), (4n + 2), (4n + 3), (n = 0, 1, ...)$ are driven by the same pulse so that the kind of this pulse series is memorized by the ring counter of arbitrary number four, thereby selecting the pulse series to be applied at the time of the fast correction.

The operation of pushing the fast correction switch will now be described.

In the normal rotation, when the second hand is at 40, for example, the fast correction switch 300 shown in FIG. 5 is closed to the + side 301 of the electric power supply source. Then, as shown in FIG. 15, after the driving pulse 0 has been applied to the driving circuit, the output is delivered to the input side A of the DATA-FF of the fast correction set circuit. This output is delivered to the output side B at the time raising $(0 \to 1)$ of the clock pulse $\phi_0$ with a lag of one half period of $\phi_0$ $(1/128^{sec})$. To the NAND output side C of A and B is delivered a fast correction set pulse whose pulse width is $1/18^{sec}$. Which is then applied to the gate $G_1$ 6 to make the pulse D 1. In addition, this fast correction set pulse is applied to the reset terminal 153 of the frequency divider circuit 2 to reset the $FF_1$ to $FF_8$ to 0. After one second, the steady state driving pulse is applied to the driving circuit. The outputs $\phi_1, \bar{\phi}_1, \phi_2, \bar{\phi}_2$ from the frequency divider circuit 2 are applied to the input terminals 400, 401, 402, 403 of the fast correction wave form conversion and change-over circuit 9 (FIG. 6), to the output terminals 425, 426, 427, 428 of which are delivered ①$\bar{\phi}'_1$,②$\bar{\phi}'_2$,③$\bar{\phi}'_3$,④$\bar{\phi}'_4$. Since the second hand position obtained by the final steady pulse is 40 ($n = 10$ for $4n$), the $R_4$ 503 only of the ring counter 50 of the selector circuit 10 (FIG. 7) becomes 1 and the outputs are delivered from the first NAND block 51 only. The outputs from the discriminator circuit 8 are of I = 0, J = 1 (normal rotation) so that from the output terminal 459 of the AND-OR select gate is delivered①$\bar{\phi}'_1$ and from the output terminal 460 is delivered③$\bar{\phi}'_3$. From the output terminal 566 of the first NAND block 51 shown in FIG. 7 is delivered①$\bar{\phi}'_1$, from the output terminal 567 is delivered ② $\bar{\phi}'_2$, from the output terminal 568 is delivered③ $\bar{\phi}'_3$, and from the output terminal 569 is delivered ④ $\bar{\phi}'_4$.

The pulse ①$\bar{\phi}'_1$ applied to the input terminal 271 of the NOR gate 230 of the driving circuit 4 shown in FIG. 4 is applied to the NAND gate 234 with its polarity inverted to cause the NAND gate 234 to operate as a NOR gate. The pulse ①$\bar{\phi}'_1$ is applied through the driving inverter 237 to the input terminal a 242 of the driving coil 243, the pulse ② $\bar{\phi}'_2$ is applied to the input terminal b 241 of the driving coil 244, the pulse③$\bar{\phi}'_3$ is applied to the input terminal c 245 of the driving coil 243, and the pulse④$\bar{\phi}'_4$ is applied to the input terminal d 246 of the driving coil 244. This order ($a \to b \to c \to d$) is of the same order as the steady rotation so that the motor is rapidly rotated in the normal direction.

If the driving pulse applied to the terminal a of the driving coil 243 causes the second hand position to move to $4n + 1$ ($n = 0, 1, 2, ...$), the driving pulse applied to the terminal b of the driving coil 244 causes the second hand position to move to $4n + 2$, the driving pulse applied to the terminal c of the driving coil 243 causes the second hand position to move to $4n + 3$, and the driving pulse applied to the terminal d of the driving coil 244 causes the second hand position to move to $4n$. If $4n \geq 31$ (normal rotation), the final driving pulse prior to the fast correction is applied to the terminal d of the driving coil 244, and as a result, when the fast correction is to be effected, the pulse①$\phi'_1$ is applied to the terminal a, the pulse②$\phi'_2$ is applied to the terminal b, the pulse③ $\phi'_3$ is applied to the terminal c, and the pulse④$\phi'_4$ is applied to the terminal d as shown in FIG. 10 (1).

If $4n + 1 \geq 31$, the pulse ④ $\phi'_4$ is applied to the terminal a, the pulse①$\phi'_1$ is applied to the terminal b, the pulse ② $\phi'_2$ is applied to the terminal c, and the pulse③$\phi'_3$ is applied to the terminal d as shown in FIG. 10 (2).

If $4n + 2 \geq 31$, the pulse ③ $\phi'_3$ is applied to the terminal $a$, the pulse ④$\phi'_4$ is applied to the terminal $b$, the pulse ① $\phi'_1$ is applied to the terminal $c$, and the pulse ② $\phi'_2$ is applied to the terminal $d$ as shown in FIG. 10 (3).

If $4n + 3 \geq 31$, the pulse ② $\phi'_2$ is applied to the terminal $a$, the pulse ③ $\phi'_3$ is applied to the terminal $b$, the pulse ④ $\phi'_4$ is applied to the terminal $c$, and the pulse①$\phi'_4$ is applied to the terminal $d$ as shown in FIG. 10 (4).

The output from the first gate $G_1$ 6 shown in FIG. 5 becomes D = 1 when the fast-correction switch is pushed so as to be applied to $G_1$ (6). In the change-over circuit 11 (FIG. 8), the pulse $\phi_1$ applied to the terminal 602 of the AND gate 607 is delivered as its output. Since I = 0 and J = 1, this output passes through the NAND gate 608. The input terminal $o$ 600 of the NAND gate 610 is 1 so that the output passed through the NAND gate 608 is delivered to the output terminal $k$ and is applied to the first memory circuit $M_1$ 12, thereby effecting the count of the fast correction pulses. At this time, the fast correction pulse causes the second gate $G_2$ 13 to open so that the first and second memory circuits $M_1$ 12 and $M_2$ 14 are completely separated from each other. The final value of the first memory circuit $M_1$ 12 at the steady state is added from $M_1$ = 1 0 1 0 0 0 = 40 every time one fast correction pulse is produced, that is, every time the second hand advances by one step. At $M_1$ = 1 1 1 1 0 0 = 60, that is, after 20 fast correction pulses have been applied to the driving circuit 4, the second hand position becomes 60 or 0. As a result, the outputs are delivered from the NAND gates 343, 344 and NOR gate 347 of the detector circuit 7 (FIG. 5) and the input E to the DATA-FF becomes 1 → 0. After one half period of the clock pulse $\phi_0$, that is, after 1/128 sec, the output F of the DATA-FF becomes 1 → 0. The NOR effect of the output F and the clock pulse $\phi_0$ produces a gate open pulse which is lagged by one period of the clock pulse $\phi_0$, i. e. 1/64 sec, that is, lagged from the final fast correction pulse by one pulse (at the tine of completion of the final fast correction pulse). This gate open pulse is applied to the first gate $G_1$ 6 to make the output 322 D zero and cut off the fast correction pulse. In addition, this gate open pulse is applied to the reset terminal 629 of the first memory circuit $M_1$ 12 to reset it to $M_1$ = 0 0 0 0 0 0, set the discriminator circuit 8 to (I = 1, J = 0), and make the flip-flops of the ring counter 50 (FIG. 7) of the selector circuit 10 $R_1 = R_2 = R_3 = 0, R_4 = 1$, thereby making ready for the initial steady driving pulse.

The time lapsed from the pushing of the fast correction switch to the advance of 40 → 0 of the second hand position is only (1/64) × 20 sec. Thus, when the fast correction switch is pushed, the frequency divider circuit 2 is reset to 0. When the steady driving pulse is produced after 1 second, the initial steady driving pulse has already been ready at 0 position. If an error of 30 seconds is present, the second hand is returned to 0 position after 1/64 × 30 ≠ 0.5 sec so that there is a plenty of time.

After 1 second from the fast correction reset, the steady driving pulse is applied to the pulse motor. Thus, the pulse motor is rotated to start the steady operation of the second hand.

The second gate $G_2$ 13 is closed and the values of the first memory circuit $M_1$ 12 are always set to those of the second memory circuit $M_2$ 14 in the steady state.

In the case of reverse rotation, at the second hand position "20", the fast correction switch 300 is closed to the + side 301 of the electric power supply source. As shown in FIG. 16, similar to the case of normal rotation, to the NAND output side C is delivered the fast correction set pulse whose pulse width is 1/128 sec. which is then applied to the gate $G_1$ 6 to make the pulse D 1. In addition, the fast correction set pulse causes the $FF_1$ to $FF_8$ of the frequency divider circuit 2 to reset to 0. The outputs $\phi_1$, $\phi'_1$, $\phi_2$, $\bar{\phi}_2$ from the frequency divider circuit 2 are applied to the input terminals 400, 401, 402, 403 of the fast correction waveform conversion and change-over circuit 9 (FIG. 6) to the output terminals 425, 426, 427, 428 of which are delivered ① $\bar{\phi}'_1$, ②$\bar{\phi}'_2$, ③$\bar{\phi}'_3$, ④$\bar{\phi}'_4$. Since the second hand position is "20" (n = 5 for 4n), the $R_4$ 503 only of the ring counter 50 of the selector circuit 10 (FIG. 7) becomes 1 and the outputs are delivered from the first NAND block 51 only. The outputs from the discriminator circuit 8 are of I = 1, J = 0 (reverse rotation) so that from the output terminal 459 of the AND-OR select gate is delivered③$\bar{\phi}'_3$ and from the output terminal 460 is delivered $\bar{\phi}_1$. Thus, in the case of the reverse rotation, $\bar{\phi}_1$ and $\bar{\phi}_3$ for the normal rotation are changed over each other.

From the output terminal 566 of the first NAND block 51 shown in FIG. 7 is delivered ③ $\bar{\phi}'_3$, from the output terminal 567 is delivered $\bar{\phi}'_2$, from the output terminal 568 is delivered ① $\bar{\phi}'_1$, and from the output terminal 569 is delivered ④ $\bar{\phi}'_4$. Thus, the ①$\bar{\phi}'_1$ and ③ $\bar{\phi}'_3$ for the normal rotation are changed over each other.

The pulse ①$\bar{\phi}'_1$ applied to the input terminal 260 of the NOR gate 255 of the driving circuit 4 shown in FIG. 4 is applied through the NAND gate 253 and driving inverter 247 to he input terminal c 245 of the driving coil 243, the ② $\phi'\bar{\phi}_2$ is applied to the input terminal b 241 of the driving coil 244, the pulse $\bar{\phi}'_3$ is applied to the input terminal a 242 of the driving coil 243, and the pulse ④$\bar{\phi}'_4$ is applied to the input terminal d 246 of the driving coil 244. This order (c → b → a → d) is opposite to that for the steady rotation so that the motor is rapidly rotated in the reverse direction. This reverse order is shown by dotted lines in FIG. 10 (1).

If $4n \leq 30$, the pulse③$\bar{\phi}'_3$ is applied to the terminal a, the pulse②$\bar{\phi}'_2$ is applied to the terminal b, the pulse ①$\bar{\phi}'_1$ is applied to the terminal c, and the pulse④$\bar{\phi}'_4$ is applied to the terminal d as shown by dotted lines in FIG. 10 (1). The oder becomes (c → b → a → d).

If $4n +1 \leq 30$, the pulse④$\bar{\phi}'_4$ is applied to the terminal a, the pulse ③ $\bar{\phi}'_3$ is applied to the terminal b, the pulse ②$\bar{\phi}'_2$ is applied to the terminal c, and the pulse① $\bar{\phi}'_1$ is applied to the terminal d as shown by dotted lines in FIG. 10 (2). The order becomes (d → c → b → a).

If $4n + 2 \leq 30$, the pulse ① $\bar{\phi}'_3$ is applied to the terminal $a$, the pulse ④$\bar{\phi}'_4$ is applied to the terminal $b$, the pulse ③ $\bar{\phi}'_3$ is applied to the terminal $c$, and the pulse ② $\bar{\phi}'_2$ is applied to the terminal $d$ as shown by dotted line in FIG. 10 (3). Thus, the oder becomes (a → d → c → b).

If $4n + 3 \leq 30$, the pulse ② $\bar{\phi}'_2$ is applied to the terminal $a$, the pulse ① $\bar{\phi}'_1$ is applied to the terminal $b$, the pulse ④ $\bar{\phi}'_4$ is applied to the terminal $c$, and the pulse ③ $\bar{\phi}'_3$ is applied to the terminal d as shown by dotted line in FIG. 10 (4). Thus, order becomes (b → a → d → c).

The fast correction set pulse causes the output from the first gate $G_1$ 6 shown in FIG. 5 to $D = 1$. In the change-over circuit 11 (FIG. 8), the pulse $\phi_1$ applied to the AND gate 607 is delivered as the output from to AND gate 609 to the input terminal L 723 of the second memory circuit $M_2$ 14. The final value of the second memory circuit $M_2$ 14 at its steady state is equal to the final value of the first memory circuit $M_1$ 12. $M_2 = 1\ 0\ 1\ 00 = 20$ and the second gate $G_2$ 13 is opened by the fast correct pulse so that the first and second memory circuits $M_1$ 12 and $M_2$ 14 are separated from each other. The second memory circuit $M_2$ 14 operates as an independent subtraction counter from the initial value $M_2 = 1\ 0\ 1\ 0\ 0$. That is, every time one fast correction pulse is applied and the second hand is returned by one step, the subtraction calculation is effected by the second memory circuit $M_2$ 14. At $M_2 = 0\ 0\ 0\ 0\ 0$, that is, after twenty fast correction pulses have been applied to the driving circuit 4, the second hand position becomes 0. As a result, the outputs are delivered from the NAND gates 345, 346 and NOR gate 348 of the detector circuit 7 (FIG. 5). The gate open pulse is produced in the manner similar to the case of the second hand position "40". Thus, the output 322D from the first gate $G_1$ 6 becomes 0 to cut off the fast correction pulse. In addition, this gate open pulse is applied to the reset terminal 629 of the first memory circuit $M_1$ 12 to reset it to $M_1 = 0\ 0\ 0\ 0\ 0$, and make the flip-flops of the ring counter 50 (FIG. 7) of the selector circuit $R_1 = R_2 = R_3 =, R_4 = 1$.

The initial steady driving pulse produced after 1 second from the fast correction reset causes the second hand to start its steady rotation. In addition, this initial steady driving pulse is capable of closing the second gate $G_2$ 13 and always setting the values of the first memory circuit $M_1$ 12 to those of the second memory circuit $M_2$ 14.

If the stem (the fast correction switch) is pushed, at the second hand positions "31 to 59" the pulses for the normal rotation are applied to the reversible motor and at the second hand positions "1 to 30" the pulses for the reverse rotation are applied to the reversible motor until the second hand arrives at the correct time, these pulses being applied in a frequency higher than that used for the steady state. As a result, the pulse motor is rapidly rotated and it is possible to return the second hand to zero and effect the time set in an easy manner.

Highly precise timepieces such as a crystal timepiece and the like have an error of several seconds during one month so that the amount of setting times to a correct time is not so large. In addition, the frequency of the fast correct pulse can be made considerably high, for example, 64 Hz or 32 Hz. As a result, if the fast correction switch is pushed, the pulse selector circuit can select the pulses necessary for the fast correction to immediately rotate the pulse motor. Thus, in practice, the time required for the correction can be disregarded.

In the above-described embodiment, the memory circuit composed of the binary counter is operated as an addition counter when the pulse motor is rotated in the normal direction and operated as a subtraction counter when the pulse motor is rotated in the reverse direction. But, it is possible to operate the memory circuit as the subtraction counter when the pulse motor is rotated in the normal direction and operated as the addition counter when the pulse motor is rotated in the reverse direction. In addition, the first memory circuit may be operated as an addition counter for the steady pulse and the second memory circuit may be operated as a reversible counter for the fast correction pulse. Between the output terminals of the first and second memory circuits may be arranged a comparison circuit which can produce a control pulse when the output from the first memory circuit becomes in coincident with the output from the second memory circuit. Thus, it is possible to operate the second memory circuit as a subtraction counter when the pulse motor is rotated in the forward direction and as an addition counter when the pulse motor is rotated in the reverse direction.

The invention is not limited to the above-descirbed two phase type pulse motor, but may also be applied to a three phase type pulse motor.

In the above-described embodiment, the fast correction of the second hand only is effected. Such fast correction may also be applied to the fast correction of the minute hand and hour hand.

Figure 17:
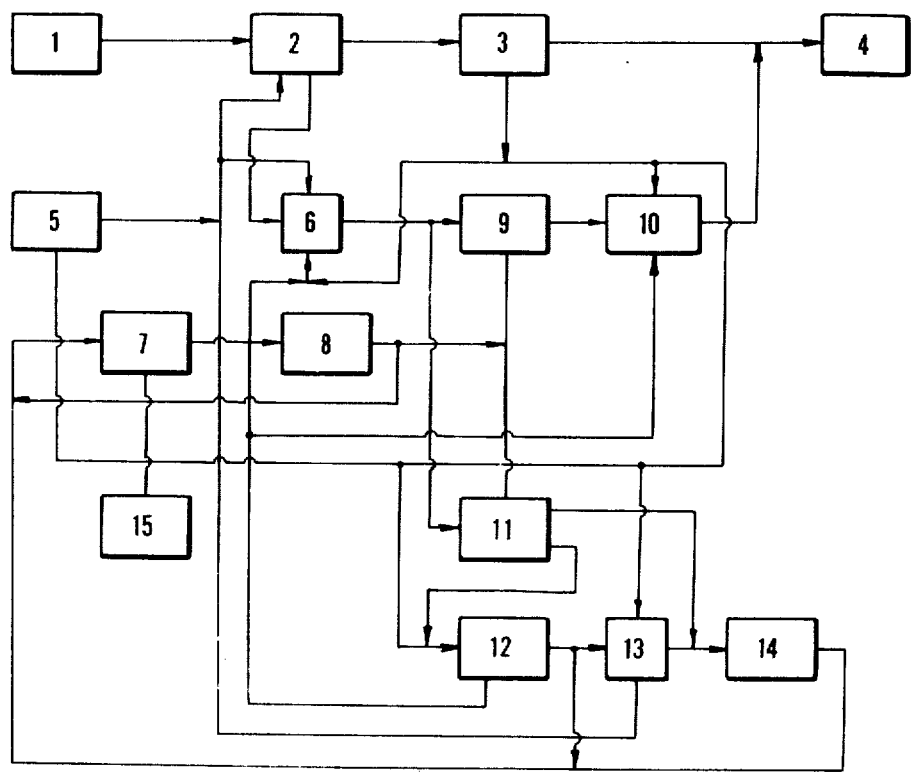
FIG. 17 is a block diagram showing a reset circuit added to the detector circuit shown in FIG. 1.
Figure 18:
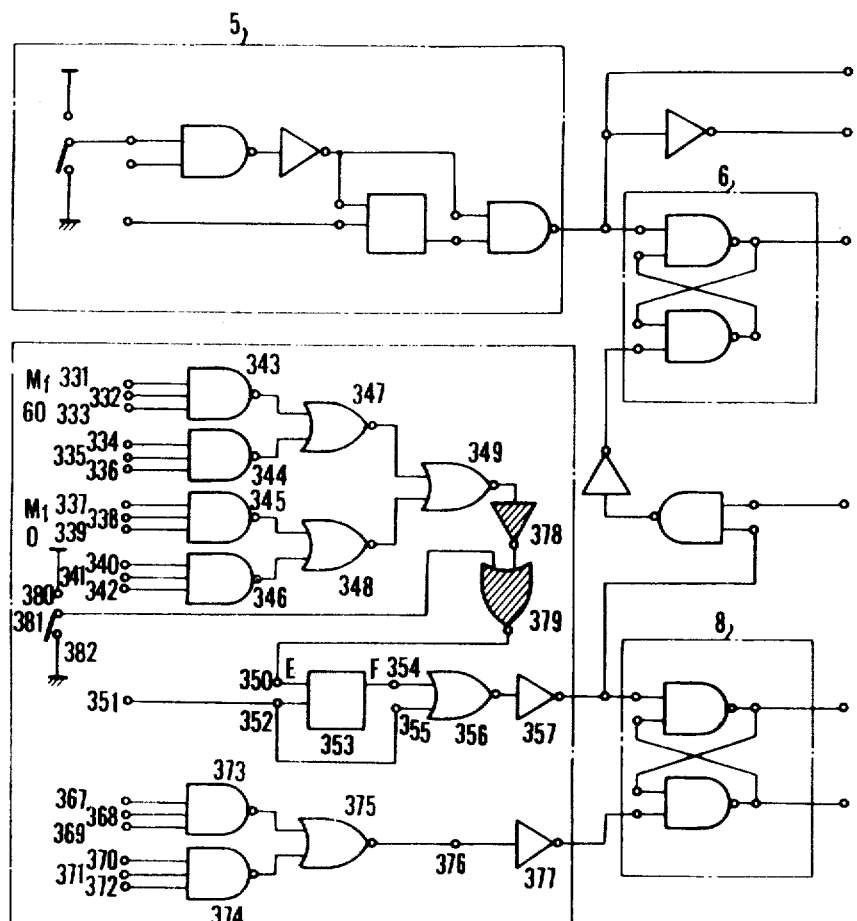
FIG. 18 is a circuit diagram showing a manual reset means arranged in the detector circuit shown in FIG. 5.

In FIG. 17 is shown a manually operating reset circuit 15 which is added to the essential electrical components shown in FIG. 1. The reset circuit 15 is capable of corresponding the second hand positions to the contents of the memory circuit. In practice, the reset circuit 15 is composed of a switch 381, inverter 378 and NOR gate 379 arranged in the detector circuit 7 shown in FIG. 5.

When the driving circuit is operated with the second hand mounted and the second hand arrives at the correct time 0, the switch 381 is closed to the + side terminal 380, thus the output is delivered from the detector circuit 7 and the pulses $M_1$ and $M_3$ are given by $M_1 = 0\ 0\ 0\ 0\ 0$ and $M_3 = 0\ 0\ 0\ 1$, respectively. As a result, the first and second memory circuits $M_1$ 12, $M_2$ 14 are set to the reverse rotation to bring the second hand positions into correspondence with the contents of these memory circuits. In addition, even when the second hand positions become out of correspondence with the contents of these memory circuits due to the errorneous operations of circuit elements or mechanical members and hence the operation of the fast correction set circuit 5 could not stop the second hand at its correct time, it is possible to correct the memory circuits if the manual reset circuit 15 is operated when the second hand arrives at the correct time.

What is claimed is:

1. A reversible continuously-operable pulse motor driving circuit comprising a memory circuit composed of a pair of counters and applied with an input pulse whose frequency is equal to the driving frequency of a pulse motor and a fast-correction circuit for producing pulse series composed of a plurality of pulse phases whose frequency is higher than the frequency ordinarily defined for driving said pulse motor, whereby said pulse series are applied to said pulse motor by required steps to rotate said pulse motor in either mormal or reverse direction.

2. A pulse motor driving circuit comprising a memory circuit composed of a counter and applied with an input pulse whose frequency is equal to the driving frequency of a pulse motor and a fast-correction circuit for producing pulse series composed of a plurality of pulse phases whose frequency is higher than the frequency ordinarily defined for driving said pulse motor, whereby said pulse series are applied to said pulse motor by required steps to rotate said pulse motor in either normal or reverse direction, said memory circuit being composed of an addition counter and a subtraction counter and each output terminal of said addition counter being connected through a gate circuit to each set terminal or reset terminal of said subtraction counter.

3. A pulse motor driving circuit comprising a memory circuit composed of a counter and applied with an input pulse whose frequency is equal to the driving frequency of a pulse motor and a fast-correction circuit for producing pulse series composed of a plurality of pulse phases whose frequency is higher than the frequency ordinarily defined for driving said pulse motor, whereby said pulse series are applied to said pulse motor by required steps to rotate said pulse motor in either normal or reverse direction, said memory circuit being composed of an addition counter and a subtraction counter and each output terminal of said subtraction counter being connected through a gate circuit to each set terminal or reset terminal of said addition counter.

4. A pulse motor driving circuit comprising a memory circuit composed of a counter and applied with an input pulse whose frequency is equal to the driving frequency of a pulse motor and a fast-correction circuit for producing pulse series composed of a plurality of pulse phases whose frequency is higher than the frequency ordinarily defined for driving said pulse motor, whereby said pulse series are applied to said pulse motor by required steps to rotate said pulse motor in either normal or reverse directon, said memory circuit being composed of an addition counter and a reversible counter and each output terminal of said addition counter and each output terminal of said reversible counter being connected to input terminals of a NAND gate, respectively.

5. A pulse motor driving circuit comprising a memory circuit composed of a counter and applied with an input pulse whose frequency is equal to the driving frequency of a pulse motor and a fast-correction circuit for producing pulse series composed of a plurality of pulse phases whose frequency is higher than the frequency ordinarily defined for driving said pulse motor, whereby said pulse series are applied to said pulse motor by required steps to rotate said pulse motor in either normal or reverse direction, and a manual reset circuit for said memory circuit, whereby a second, minute or hour hand position is brought into correspondence with the contents of said memory circuit.

* * * * *